(12) United States Patent
Yanagita et al.

(10) Patent No.: US 8,970,746 B2
(45) Date of Patent: Mar. 3, 2015

(54) IMAGE PROCESSING DEVICE, STORAGE MEDIUM, AND IMAGE PROCESSING METHOD FOR CORRECTING AN IMAGE

(75) Inventors: Shuta Yanagita, Tokyo (JP); Takeyuki Ajito, Tokyo (JP)

(73) Assignees: Olympus Corporation, Tokyo (JP); Olympus Imaging Corp., Tokyo (JP)

( * ) Notice: Subject to any disclaimer, the term of this patent is extended or adjusted under 35 U.S.C. 154(b) by 774 days.

(21) Appl. No.: 12/905,410

(22) Filed: Oct. 15, 2010

(65) Prior Publication Data

US 2011/0090362 A1 Apr. 21, 2011

(30) Foreign Application Priority Data

Oct. 15, 2009 (JP) ................................. 2009-238527
Sep. 10, 2010 (JP) ................................. 2010-203096

(51) Int. Cl.
| | |
|---|---|
| H04N 9/64 | (2006.01) |
| H04N 1/60 | (2006.01) |
| H04N 1/62 | (2006.01) |
| H04N 5/232 | (2006.01) |
| H04N 9/68 | (2006.01) |
| H04N 5/228 | (2006.01) |

(52) U.S. Cl.
CPC ............. *H04N 9/643* (2013.01); *H04N 1/6027* (2013.01); *H04N 1/62* (2013.01); *H04N 5/23219* (2013.01); *H04N 9/68* (2013.01)
USPC .......... 348/256; 348/222.1; 348/242; 348/253

(58) Field of Classification Search
USPC ............ 348/223.1, 225.1, 256, 234, 242, 253
See application file for complete search history.

(56) References Cited

U.S. PATENT DOCUMENTS

| | | | | |
|---|---|---|---|---|
| 7,142,712 | B2 * | 11/2006 | Maruoka et al. | 382/168 |
| 7,366,350 | B2 * | 4/2008 | Kajihara | 382/167 |
| 7,428,021 | B2 * | 9/2008 | Fukuda | 348/650 |

(Continued)

FOREIGN PATENT DOCUMENTS

| | | |
|---|---|---|
| CN | 101151883 A | 3/2008 |
| JP | 2000-224607 A | 8/2000 |

(Continued)

OTHER PUBLICATIONS

Chinese Office Action dated Feb. 5, 2013, issued in corresponding Chinese Patent Application No. 201010517413.9.

(Continued)

*Primary Examiner* — Ngoc-Yen Vu
(74) *Attorney, Agent, or Firm* — Westerman, Hattori, Daniels & Adrian, LLP

(57) ABSTRACT

An image processing device that corrects an obtained image includes: an image acquisition unit that obtains the image; a region setting unit that sets a first region including a main object and a second region not including the main object on the image; an image characteristic amount calculation unit that calculates a first image characteristic amount, which is an occurrence state of a predetermined image characteristic amount, respectively in the first region and the second region; a comparison unit that compares the first image characteristic amounts of the first region and the second region; and an image characteristic adjustment unit that adjusts a second image characteristic amount of the obtained image on the basis of a comparison result obtained by the comparison unit.

8 Claims, 40 Drawing Sheets

(56) References Cited

U.S. PATENT DOCUMENTS

| | | | |
|---|---|---|---|
| 7,454,056 B2* | 11/2008 | Hayaishi | 382/167 |
| 7,936,919 B2* | 5/2011 | Kameyama | 382/167 |
| 7,945,113 B2* | 5/2011 | Hayaishi | 382/274 |
| 7,957,590 B2* | 6/2011 | Watanabe et al. | 382/167 |
| 8,031,261 B2* | 10/2011 | Izawa et al. | 348/362 |
| 8,144,982 B2* | 3/2012 | Yoshida et al. | 382/167 |
| 8,525,899 B2* | 9/2013 | Imai | 348/223.1 |
| 2007/0085911 A1* | 4/2007 | Nakamura | 348/223.1 |
| 2009/0324069 A1* | 12/2009 | Kawai | 382/165 |

FOREIGN PATENT DOCUMENTS

| | | |
|---|---|---|
| JP | 2005-295490 A | 10/2005 |
| JP | 2008-092515 A | 4/2008 |
| JP | 2009-105951 A | 5/2009 |

OTHER PUBLICATIONS

Office Action dated Oct. 21, 2014, issued in corresponding Japanese Patent Application No. 2010-203096 (4 pages).

* cited by examiner

| SATURATION | HUE | TABULATION RESULTS |
|---|---|---|
| HIGH | RED | K1 |
| | PURPLE | K2 |
| | BLUE | K3 |
| | CYAN | K4 |
| | GREEN | K5 |
| | YELLOW | K6 |
| LOW | RED | L1 |
| | PURPLE | L2 |
| | BLUE | L3 |
| | CYAN | L4 |
| | GREEN | L5 |
| | YELLOW | L6 |
| SKIN-COLOR | | S1 |
| SKY-COLOR | | S2 |

FIG.6A

| SATURATION | HUE | TABULATION RESULTS |
|---|---|---|
| HIGH | RED | M1 |
| | PURPLE | M2 |
| | BLUE | M3 |
| | CYAN | M4 |
| | GREEN | M5 |
| | YELLOW | M6 |
| LOW | RED | N1 |
| | PURPLE | N2 |
| | BLUE | N3 |
| | CYAN | N4 |
| | GREEN | N5 |
| | YELLOW | N6 |

FIG.6B

| | SATURATION EMPHASIS COEFFICIENT |
|---|---|
| FIRST PIXEL COUNT RATIO Pr1 ≧ SECOND THRESHOLD | 1.2 |
| FIRST PIXEL COUNT RATIO Pr1 < SECOND THRESHOLD | 0.8 |
| NUMBER OF SKIN-COLORED PIXELS S1 ≧ THIRD THRESHOLD | 1.0 |
| NUMBER OF SKY-COLORED PIXELS S2 ≧ FOURTH THRESHOLD | 1.2 |

FIG.7

|  |  | SATURATION EMPHASIS COEFFICIENT | SPECIFIC COLOR SATURATION EMPHASIS COEFFICIENT |
|---|---|---|---|
| FIRST PIXEL COUNT RATIO Pr1≧SECOND THRESHOLD | SECOND PIXEL COUNT RATIO Pr2≧FIFTH THRESHOLD | 1.0 | 1.2 |
| | SECOND PIXEL COUNT RATIO Pr2＜FIFTH THRESHOLD | 1.2 | 1.0 |
| FIRST PIXEL COUNT RATIO Pr1＜SECOND THRESHOLD | SECOND PIXEL COUNT RATIO Pr2≧FIFTH THRESHOLD | 1.0 | 0.8 |
| | SECOND PIXEL COUNT RATIO Pr2＜FIFTH THRESHOLD | 0.8 | 1.0 |
| NUMBER OF SKIN-COLORED PIXEL S1≧THRID THRESHOLD | THIRD PIXEL COUNT RATIO Pr3≧SIXTH THRESHOLD | 1.0 | 1.2 |
| | THIRD PIXEL COUNT RATIO Pr3＜SIXTH THRESHOLD | 1.0 | 1.0 |
| NUMBER OF SKY-COLORED PIXEL S2≧FOURTH THRESHOLD | SECOND PIXEL COUNT RATIO Pr2≧FIFTH THRESHOLD | 1.2 | 1.2 |
| | SECOND PIXEL COUNT RATIO Pr2＜FIFTH THRESHOLD | 1.2 | 0.8 |

FIG.11

|  | SUBJECT REGION | NON-SUBJECT REGION |
| --- | --- | --- |
| INTEGRATED VALUE RATIO I≧SEVENTH THRESHOLD | EDGE EMPHASIS COEFFICIENT : 2.0 BLURRING PROCESSING COEFFICIENT : 1.0 | EDGE EMPHASIS COEFFICIENT : 1.0 BLURRING PROCESSING COEFFICIENT : 2.0 |
| INTEGRATED VALUE RATIO I＜SEVENTH THRESHOLD | EDGE EMPHASIS COEFFICIENT : 1.0 BLURRING PROCESSING COEFFICIENT : 1.0 | EDGE EMPHASIS COEFFICIENT : 1.0 BLURRING PROCESSING COEFFICIENT : 1.0 |

FIG.17

| | | SUBJECT REGION | NON-SUBJECT REGION |
|---|---|---|---|
| FIRST PIXEL COUNT RATIO Pr1 ≧ SECOND THRESHOLD | INTEGRATED VALUE RATIO I ≧ SEVENTH THRESHOLD | SATURATION EMPHASIS COEFFICIENT: 2.0<br>EDGE EMPHASIS COEFFICIENT: 2.0<br>BLURRING PROCESSING COEFFICIENT: 1.0 | SATURATION EMPHASIS COEFFICIENT: 0.5<br>EDGE EMPHASIS COEFFICIENT: 1.0<br>BLURRING PROCESSING COEFFICIENT: 2.0 |
| | INTEGRATED VALUE RATIO I < SEVENTH THRESHOLD | SATURATION EMPHASIS COEFFICIENT: 2.0<br>EDGE EMPHASIS COEFFICIENT: 1.0<br>BLURRING PROCESSING COEFFICIENT: 1.0 | SATURATION EMPHASIS COEFFICIENT: 0.5<br>EDGE EMPHASIS COEFFICIENT: 1.0<br>BLURRING PROCESSING COEFFICIENT: 1.2 |
| FIRST PIXEL COUNT RATIO Pr1 < SECOND THRESHOLD | INTEGRATED VALUE RATIO I ≧ SEVENTH THRESHOLD | SATURATION EMPHASIS COEFFICIENT: 1.0<br>EDGE EMPHASIS COEFFICIENT: 2.0<br>BLURRING PROCESSING COEFFICIENT: 1.0 | SATURATION EMPHASIS COEFFICIENT: 0.8<br>EDGE EMPHASIS COEFFICIENT: 1.0<br>BLURRING PROCESSING COEFFICIENT: 2.0 |
| | INTEGRATED VALUE RATIO I < SEVENTH THRESHOLD | SATURATION EMPHASIS COEFFICIENT: 1.0<br>EDGE EMPHASIS COEFFICIENT: 1.0<br>BLURRING PROCESSING COEFFICIENT: 1.0 | SATURATION EMPHASIS COEFFICIENT: 0.8<br>EDGE EMPHASIS COEFFICIENT: 1.0<br>BLURRING PROCESSING COEFFICIENT: 1.2 |
| NUMBER OF SKIN-COLORED PIXEL S1 ≧ THRID THRESHOLD | INTEGRATED VALUE RATIO I ≧ SEVENTH THRESHOLD | SATURATION EMPHASIS COEFFICIENT: 1.0<br>EDGE EMPHASIS COEFFICIENT: 1.0<br>BLURRING PROCESSING COEFFICIENT: 1.0 | SATURATION EMPHASIS COEFFICIENT: 0.8<br>EDGE EMPHASIS COEFFICIENT: 1.0<br>BLURRING PROCESSING COEFFICIENT: 2.0 |
| | INTEGRATED VALUE RATIO I < SEVENTH THRESHOLD | SATURATION EMPHASIS COEFFICIENT: 1.0<br>EDGE EMPHASIS COEFFICIENT: 1.0<br>BLURRING PROCESSING COEFFICIENT: 1.0 | SATURATION EMPHASIS COEFFICIENT: 1.0<br>EDGE EMPHASIS COEFFICIENT: 1.0<br>BLURRING PROCESSING COEFFICIENT: 1.2 |
| NUMBER OF SKY-COLORED PIXEL S2 ≧ FOURTH THRESHOLD | INTEGRATED VALUE RATIO I ≧ SEVENTH THRESHOLD | SATURATION EMPHASIS COEFFICIENT: 2.0<br>EDGE EMPHASIS COEFFICIENT: 1.2<br>BLURRING PROCESSING COEFFICIENT: 1.0 | SATURATION EMPHASIS COEFFICIENT: 1.0<br>EDGE EMPHASIS COEFFICIENT: 1.0<br>BLURRING PROCESSING COEFFICIENT: 2.0 |
| | INTEGRATED VALUE RATIO I < SEVENTH THRESHOLD | SATURATION EMPHASIS COEFFICIENT: 2.0<br>EDGE EMPHASIS COEFFICIENT: 1.0<br>BLURRING PROCESSING COEFFICIENT: 1.0 | SATURATION EMPHASIS COEFFICIENT: 1.0<br>EDGE EMPHASIS COEFFICIENT: 1.0<br>BLURRING PROCESSING COEFFICIENT: 1.2 |

FIG.22

| SATU-RATION | HUE | TABU-LATION RESU-LTS | CENTER OF GRAVITY | DISPERSION |
|---|---|---|---|---|
| HIGH | RED | K1 | (xK1,yK1) | (x'K1,y'K1) |
| | PURPLE | K2 | (xK2,yK2) | (x'K2,y'K2) |
| | BLUE | K3 | (xK3,yK3) | (x'K3,y'K3) |
| | CYAN | K4 | (xK4,yK4) | (x'K4,y'K4) |
| | GREEN | K5 | (xK5,yK5) | (x'K5,y'K5) |
| | YELLOW | K6 | (xK6,yK6) | (x'K6,y'K6) |
| LOW | RED | L1 | (xL1,yL1) | (x'L1,y'L1) |
| | PURPLE | L2 | (xL2,yL2) | (x'L2,y'L2) |
| | BLUE | L3 | (xL3,yL3) | (x'L3,y'L3) |
| | CYAN | L4 | (xL4,yL4) | (x'L4,y'L4) |
| | GREEN | L5 | (xL5,yL5) | (x'L5,y'L5) |
| | YELLOW | L6 | (xL6,yL6) | (x'L6,y'L6) |
| SKIN-COLOR | | S1 | (xS1,yS1) | (x'S1,y'S1) |
| SKY-COLOR | | S2 | (xS2,yS2) | (x'S2,y'S2) |

FIG.27A

| SATURA-TION | HUE | TABULA-TION RESULTS |
|---|---|---|
| HIGH | RED | M1 |
| | PURPLE | M2 |
| | BLUE | M3 |
| | CYAN | M4 |
| | GREEN | M5 |
| | YELLOW | M6 |
| LOW | RED | N1 |
| | PURPLE | N2 |
| | BLUE | N3 |
| | CYAN | N4 |
| | GREEN | N5 |
| | YELLOW | N6 |

FIG.27B

|  |  | REPRESENTATIVE DISPERSION VKi ≧ EIGHTH THRESHOLD | | REPRESENTATIVE DISPERSION VKi < EIGHTH THRESHOLD | |
| --- | --- | --- | --- | --- | --- |
|  |  | SATURATION EMPHASIS COEFFICIENT | SPECIFIC COLOR SATURATION EMPHASIS COEFFICIENT | SATURATION EMPHASIS COEFFICIENT | SPECIFIC COLOR SATURATION EMPHASIS COEFFICIENT |
| FIRST PIXEL COUNT RATIO Pr1 ≧ SECOND THRESHOLD | SECOND PIXEL COUNT RATIO Pr2 ≧ FIFTH THRESHOLD | 1.0 | 1.1 | 1.0 | 1.5 |
|  | SECOND PIXEL COUNT RATIO Pr2 < FIFTH THRESHOLD | 1.2 | 1.0 | 1.2 | 1.1 |
| FIRST PIXEL COUNT RATIO Pr1 < SECOND THRESHOLD | SECOND PIXEL COUNT RATIO Pr2 ≧ FIFTH THRESHOLD | 1.0 | 0.7 | 1.0 | 0.8 |
|  | SECOND PIXEL COUNT RATIO Pr2 < FIFTH THRESHOLD | 0.7 | 0.9 | 0.8 | 1.0 |
| NUMBER OF SKIN-COLORED PIXELS S1 ≧ THIRD THRESHOLD | THIRD PIXEL COUNT RATIO Pr3 ≧ SIXTH THRESHOLD | 1.0 | 1.1 | 1.0 | 1.2 |
|  | THIRD PIXEL COUNT RATIO Pr3 < SIXTH THRESHOLD | 1.2 | 1.0 | 1.0 | 1.0 |
| NUMBER OF SKY-COLORED PIXELS S2 ≧ FOURTH THRESHOLD | SECOND PIXEL COUNT RATIO Pr2 ≧ FIFTH THRESHOLD | 1.0 | 1.1 | 1.2 | 1.2 |
|  | SECOND PIXEL COUNT RATIO Pr2 < FIFTH THRESHOLD | 1.2 | 1.0 | 1.2 | 0.8 |

FIG.28

|  |  | NOISE CORRECTION COEFFICIENT | |
|---|---|---|---|
|  |  | SUBJECT REGION | NON-SUBJECT REGION |
| INTEGRATED VALUE RATIO I≧NINTH THRESHOLD | THIRD INTEGRATED VALUE Fh≧ TENTH THRESHOLD | 1.2 | 0.8 |
| | THIRD INTEGRATED VALUE Fh< TENTH THRESHOLD | 1.5 | 1.0 |
| INTEGRATED VALUE RATIO I<NINTH THRESHOLD | THIRD INTEGRATED VALUE Fh≧ TENTH THRESHOLD | 0.7 | 1.0 |
| | THIRD INTEGRATED VALUE Fh< TENTH THRESHOLD | 0.6 | 0.8 |

FIG.32

| HUE | SATURATION | | MODE |
|---|---|---|---|
| | HIGH | LOW | |
| RED | K1 | L1 | H1 |
| PURPLE | K2 | L2 | H2 |
| BLUE | K3 | L3 | H3 |
| CYAN | K4 | L4 | H4 |
| GREEN | K5 | L5 | H5 |
| YELLOW | K6 | L6 | H6 |
| SKIN-COLOR | S1 | — | — |
| SKY-COLOR | S2 | — | — |

FIG.37

| | | TWELFTH THRESHOLD ≤ MODE Hi ≤ THIRTEENTH THRESHOLD | | MODE Hi < TWELFTH THRESHOLD | | THIRTEENTH < MODE Hi | |
|---|---|---|---|---|---|---|---|
| | | SATURATION EMPHASIS COEFFICIENT | SPECIFIC COLOR SATURATION EMPHASIS COEFFICIENT | SATURATION EMPHASIS COEFFICIENT | SPECIFIC COLOR SATURATION EMPHASIS COEFFICIENT | SATURATION EMPHASIS COEFFICIENT | SPECIFIC COLOR SATURATION EMPHASIS COEFFICIENT |
| FIRST PIXEL COUNT RATIO Pr1 ≥ SECOND THRESHOLD | SECOND PIXEL COUNT RATIO Pr2 ≥ FIFTH THRESHOLD | 1.0 | 1.1 | 1.0 | 1.6 | — | — |
| | SECOND PIXEL COUNT RATIO Pr2 < FIFTH THRESHOLD | 1.2 | 1.0 | 1.2 | 1.1 | — | — |
| FIRST PIXEL COUNT RATIO Pr1 < SECOND THRESHOLD | SECOND PIXEL COUNT RATIO Pr2 ≥ FIFTH THRESHOLD | 1.0 | 0.7 | — | — | 1.0 | 0.8 |
| | SECOND PIXEL COUNT RATIO Pr2 < FIFTH THRESHOLD | 0.7 | 0.9 | — | — | 1.0 | 1.0 |
| NUMBER OF SKIN-COLORED PIXELS S1 ≥ THIRD THRESHOLD | THIRD PIXEL COUNT RATIO Pr3 ≥ SIXTH THRESHOLD | 1.0 | 1.1 | 1.0 | 1.2 | — | — |
| | THIRD PIXEL COUNT RATIO Pr3 < SIXTH THRESHOLD | 1.2 | 1.0 | 1.0 | 1.0 | — | — |
| NUMBER OF SKY-COLORED PIXELS S2 ≥ FOURTH THRESHOLD | SECOND PIXEL COUNT RATIO Pr2 ≥ FIFTH THRESHOLD | 1.0 | 1.1 | 1.2 | 1.2 | — | — |
| | SECOND PIXEL COUNT RATIO Pr2 < FIFTH THRESHOLD | 1.2 | 1.0 | 1.2 | 0.8 | — | — |

FIG.38

IMAGE PROCESSING DEVICE, STORAGE MEDIUM, AND IMAGE PROCESSING METHOD FOR CORRECTING AN IMAGE

FIELD OF THE INVENTION

This invention relates to an image processing device, a storage medium, and an image processing method.

BACKGROUND OF THE INVENTION

A method of correcting a saturation is known as a conventional method of correcting a photographed image. A method of correcting the saturation is disclosed in JP2000-224607A, for example.

In JP2000-224607A, an image is divided into a plurality of regions and a saturation level is calculated for each region. An overall saturation of the image is then corrected using the region having the highest saturation level as a reference.

SUMMARY OF THE INVENTION

An image processing device according to an aspect of this invention includes: an image acquisition unit that obtains an image; a region setting unit that sets a first region including a main object and a second region not including the main object on the image; an image characteristic amount calculation unit that calculates a first image characteristic amount, which is an occurrence frequency of a predetermined image characteristic amount, respectively in the first region and the second region; a comparison unit that compares the first image characteristic amounts of the first region and the second region; and an image characteristic adjustment unit that adjusts a second image characteristic amount of the obtained image on the basis of a comparison result obtained by the comparison unit.

A storage medium according to another aspect of this invention is a computer-readable storage medium storing a program for causing a computer to perform processing on an obtained image, wherein the program includes: a step of obtaining the image; a step of setting a first region including a main object and a second region not including the main object on the image; a step of calculating a first image characteristic amount, which is an occurrence frequency of a predetermined image characteristic amount, respectively in the first region and the second region; a step of comparing the first image characteristic amounts of the first region and the second region; and a step of adjusting a second image characteristic amount of the obtained image on the basis of a comparison result.

An image processing method according to a further aspect of this invention includes: obtaining an image; setting a first region including a main object and a second region not including the main object on the image; calculating a first image characteristic amount, which is an occurrence frequency of a predetermined image characteristic amount, respectively in the first region and the second region; comparing the first image characteristic amounts of the first region and the second region; and adjusting a second image characteristic amount of the obtained image on the basis of a comparison result.

BRIEF DESCRIPTION OF THE DRAWINGS

FIG. 6A is a view showing a tabulation result of an image characteristic amount according to the first embodiment.

FIG. 6B is a view showing a tabulation result of the image characteristic amount according to the first embodiment.

FIG. 7 is a map used to calculate a saturation emphasis coefficient according to the first embodiment.

FIG. 11 is a map used to calculate a saturation emphasis coefficient and a specific color saturation emphasis coefficient according to the second embodiment.

FIG. 17 is a map used to calculate an edge emphasis coefficient and a blurring processing coefficient according to the third embodiment.

FIG. 22 is a map used to calculate a saturation emphasis coefficient, an edge emphasis coefficient, and a blurring processing coefficient according to the fourth embodiment.

FIG. 27A is a view showing a tabulation result of an image characteristic amount according to the fifth embodiment.

FIG. 27B is a view showing a tabulation result of the image characteristic amount according to the fifth embodiment.

FIG. 28 is a map used to calculate a saturation emphasis coefficient and a specific color saturation emphasis coefficient according to the fifth embodiment.

FIG. 32 is a map used to calculate a noise correction coefficient according to the sixth embodiment.

FIG. 37 is a view showing a tabulation result obtained by the first region color tabulation unit.

FIG. 38 is a map used to calculate a saturation emphasis coefficient and a specific color saturation emphasis coefficient according to the seventh embodiment.

DESCRIPTION OF THE PREFERRED EMBODIMENTS

A first embodiment of this invention will now be described.

Figure 1:
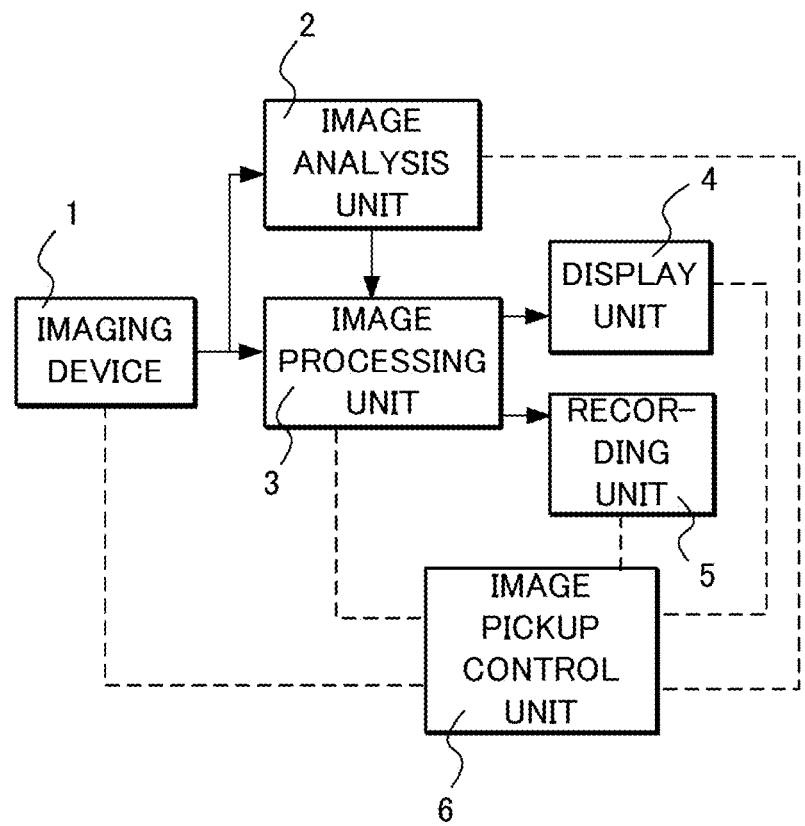
FIG. 1 is a schematic block diagram showing an image pickup device according to a first embodiment.

An image pickup device according to this embodiment will be described using FIG. 1. FIG. 1 is a schematic block diagram showing a part of the image pickup device according to this embodiment. The image pickup device to be described below functions as an image processing device for processing a photographed image.

The image pickup device according to this embodiment comprises an imaging device (image acquisition unit) 1, an image analysis unit 2, an image processing unit (image characteristic adjustment unit) 3, a display unit 4, a recording unit 5, and an image pickup control unit 6.

The imaging device 1 outputs an electric signal corresponding to light incident on a light receiving surface at a predetermined timing. The imaging device 1 is of a type known as a CCD (Charge Coupled Device) or CMOS (Complementary Metal Oxide Semiconductor) sensor or one of various other types.

Figure 2:
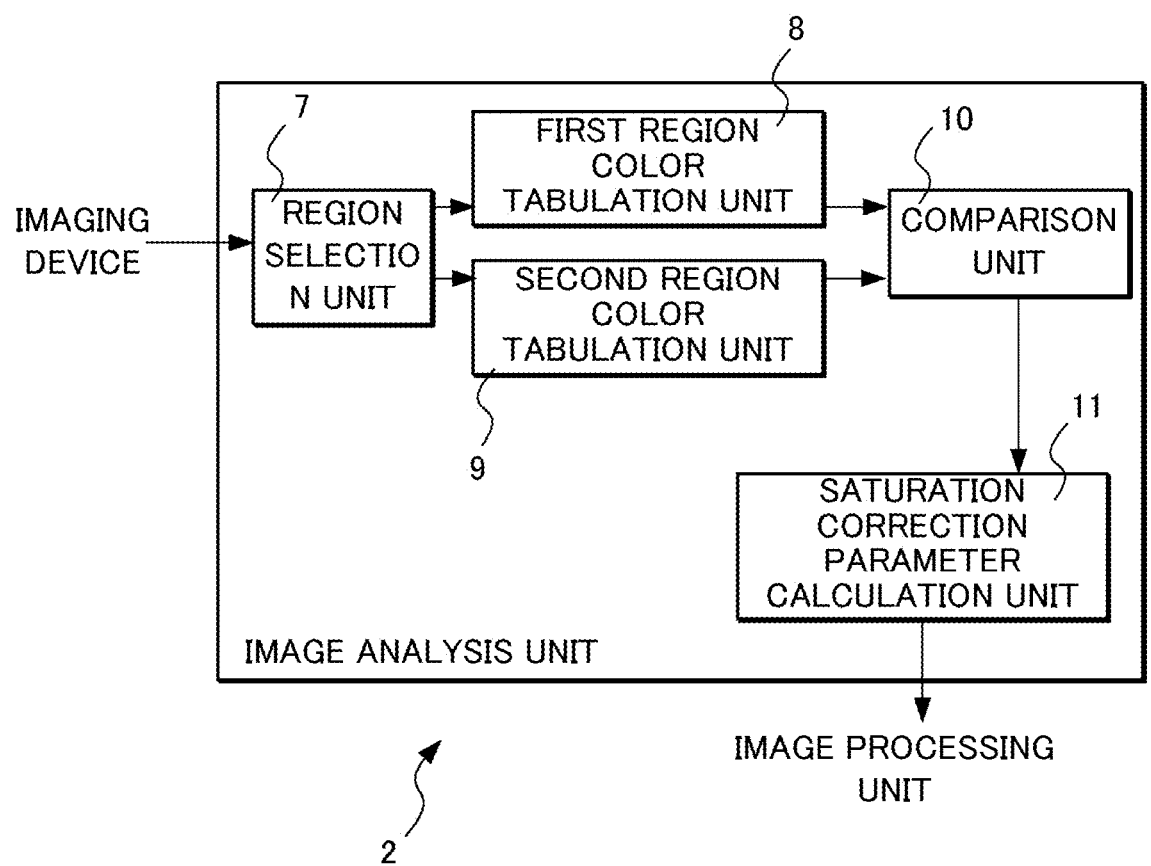
FIG. 2 is a schematic block diagram showing an image analysis unit according to the first embodiment.

The image analysis unit 2 will now be described using FIG. 2. FIG. 2 is a schematic block diagram showing the image analysis unit 2.

The image analysis unit 2 comprises a region selection unit 7, a first region color tabulation unit (image characteristic amount calculation unit) 8, a second region color tabulation unit (image characteristic amount calculation unit) 9, a comparison unit 10, and a saturation correction parameter calculation unit 11.

Figure 3:
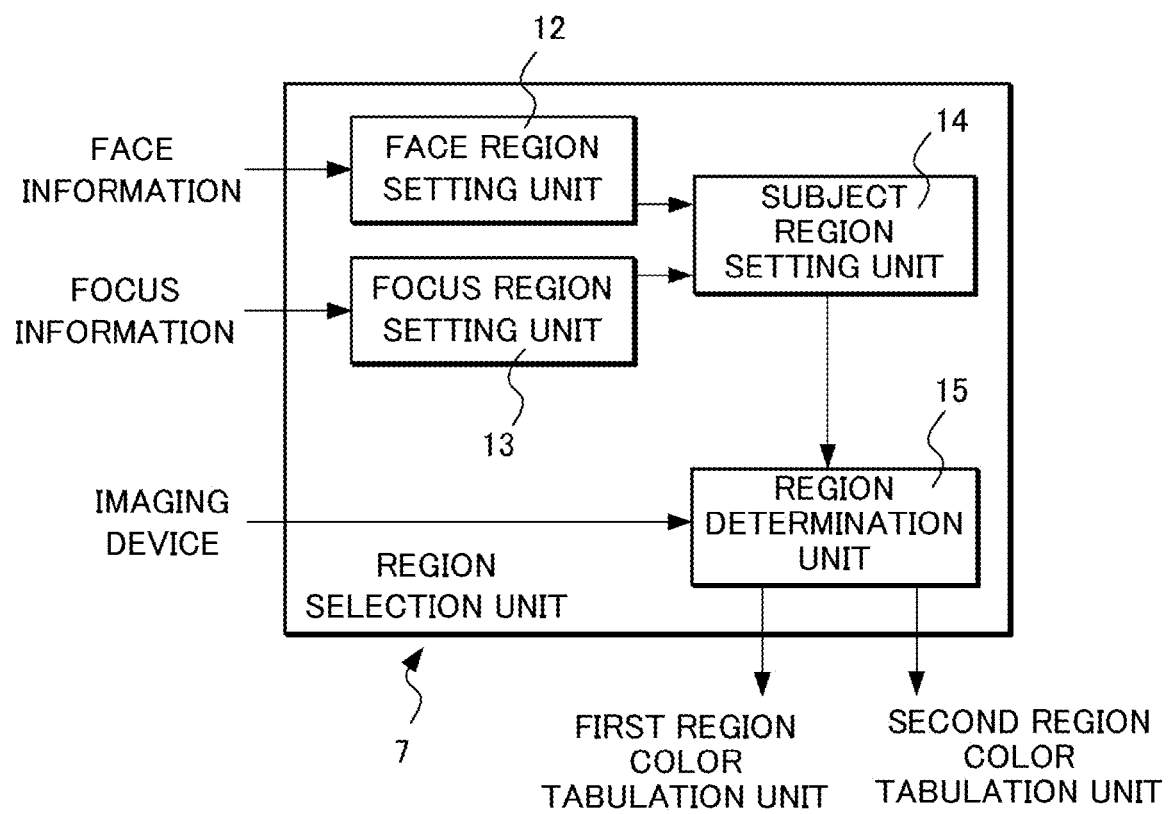
FIG. 3 is a schematic block diagram showing a region selection unit according to the first embodiment.

The region selection unit 7 will now be described using FIG. 3. FIG. 3 is a schematic block diagram showing the region selection unit 7.

The region selection unit 7 comprises a face region setting unit 12, a focus region setting unit 13, a subject region setting unit (region setting unit) 14, and a region determination unit (region setting unit) 15.

The face region setting unit 12 selects a region including a main object from image data obtained via the imaging device 1 on the basis of face information output from a face detection unit, not shown in the figures. The main object may be the face of a human or an animal, for example, but is not limited thereto. It should be noted that in this embodiment, a face is included in the main object, but a face need not be included in the main object.

The focus region setting unit 13 sets a focus region on the basis of autofocus information (AF information) output from a focusing unit, not shown in the figures. It should be noted that the focus region may be set on the basis of manual focus information (MF information). Further, a preset region may be set as the focus region.

Figure 4:
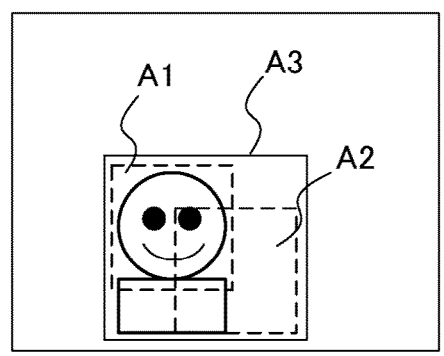
FIG. 4 is a view showing an example of a subject region.

The subject region setting unit 14 sets a subject region (a first region) on the basis of the face region selected by the face region setting unit 12 and the focus region set by the focus region setting unit 13. The subject region is a region including the face region and the focus region, and therefore includes the main object. For example, when an image shown in FIG. 4 is obtained by image pickup, the subject region is a rectangular region A3 including a face region A1 and a focus region A2.

It should be noted that the subject region may include only one of the face region and the focus region. Further, the subject region may be fixed in advance in an image center, an image lower portion, or another part of the image.

Figure 5:
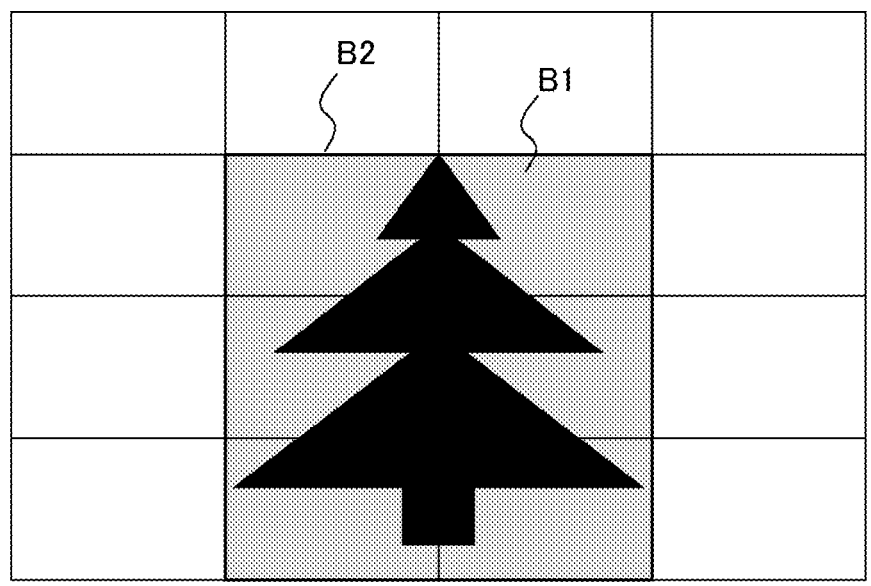
FIG. 5 is a view showing an example of the subject region.

Furthermore, the region selection unit 7 may divide an image surface into a plurality of rectangular regions and set the subject region by determining a spatial frequency distribution of each region. For example, when an image shown in FIG. 5 is obtained by image pickup, the subject region is a region B2 incorporating a region B1 in which a high frequency component exceeds a predetermined frequency.

The region determination unit 15 sets a region other than the subject region set by the subject region setting unit 14 as a non-subject region (a second region). The non-subject region is a region not including the main object.

Further, in the embodiment described above, a distance to the object may be measured from a size of the head or face of the human or animal or the like and a nearest object may be set as the subject region. Furthermore, a frame region indicated to a user by a camera through a composition assistance function or the like may be set as the subject region. The subject region may also be set by referencing composition patterns and scene modes having preset subject regions. The subject region may also be set by recognizing a pre-registered individual. A region having a high contrast (great light intensity variation) may be set as the subject region. The user may specify and set the subject region or the non-subject region using a back surface monitor (including a touch panel). The user may specify the subject region by moving/enlarging a specification frame while viewing the back surface monitor or a finder. A part that is displayed in enlarged form during manual focus image pickup may be set as the subject region. Image pickup may be performed a plurality of times while varying a stroboscopic light intensity, a focus position, and an aperture value, and the subject region may be set according to a luminance difference, an edge component, or similar. The subject region and the non-subject region may be set in accordance with a threshold of an image characteristic, a correlation function, a level setting method, and so on. The subject region may also be set by setting a moving object as a subject object using known motion detection.

Returning to FIG. 2, the first region color tabulation unit 8 tabulates a image characteristic amount (first image characteristic amount) in the subject region on the basis of image data relating to the subject region. The image characteristic amount is a number of pixels having an identical image characteristic (a predetermined image characteristic amount) in a certain region. In fact, the image characteristic amount is an occurrence state having the identical image characteristic in the certain region. Image characteristics include color information, frequency information, edge detection information, and so on. The color information includes lightness information, saturation information, and so on. In this embodiment, saturation and hue are used as the image characteristics. The first region color tabulation unit 8 sorts the pixels in the subject region into pixels having a higher saturation than a first threshold (predetermined value) and pixels having a lower saturation than the first threshold. The first threshold takes a preset value. The first region color tabulation unit 8 also sorts the pixels in the subject region into hues. The sorted hues are red, purple, blue, cyan, green, and yellow. The pixels are sorted into hues by determining whether or not the hue of a pixel belongs to a range that can be recognized as a sorted hue. A range enabling recognition as a sorted hue is set for each hue. The first region color tabulation unit 8 then tabulates the image characteristic amount of the subject region on the basis of the saturation and the hue. It should be noted that in this embodiment, six hues, namely red, purple, blue, cyan, green, and yellow, are set as the sorted hues, but this invention is not limited thereto, and eight hues, for example, may be set.

Further, the first region color tabulation unit 8 tabulates numbers of pixels recognizable as skin-colored and sky-colored in the subject region. The first region color tabulation unit 8 tabulates the image characteristic amount on the basis of the saturation and hue but may perform tabulation on the basis of the lightness and hue or a combination of the lightness, hue, and saturation.

The second region color tabulation unit 9 tabulates the image characteristic amount of the non-subject region on the basis of image data relating to the non-subject region determined by the region determination unit 15. The tabulation method employed by the second region color tabulation unit 9 is identical to that of the first region color tabulation unit 8 except that the second region color tabulation unit 9 does not tabulate the numbers of skin-colored and sky-colored pixels.

When tabulation results obtained by the first region color tabulation unit 8 and second region color tabulation unit 9 are represented by tables, tables such as those shown in FIGS. 6A and 6B, for example, are obtained. FIG. 6A shows the tabulation results obtained by the first region color tabulation unit 8, and FIG. 6B shows the tabulation results obtained by the second region color tabulation unit 9. In the subject region, pixels having a higher saturation than the first threshold are indicated by "Ki" and pixels having a lower saturation than the first threshold are indicated by "Li". Further, in the non-subject region, pixels having a higher saturation than the first threshold are indicated by "Mi" and pixels having a lower saturation than the first threshold are indicated by "Ni". Here, "i" is an integer between 1 and 6, and corresponds to the hue. When the hue is red, i=1. The numerical value of i then increases successively through purple, blue, cyan, green, and yellow such that when the hue is yellow, i=6. The numbers of skin-colored pixels and sky-colored pixels in the subject region are indicated by S1 and S2, respectively.

The comparison unit 10 compares the image characteristic amount of the subject region to the image characteristic amount of the non-subject region. The comparison unit 10 calculates a first pixel count ratio Pr1 (=Max (Ki)/Max (Mi)), which is a ratio between a pixel count Max (Ki) of a hue having a higher saturation than the first threshold and the largest number of pixels in the subject region and a pixel count Max (Mi) of a hue having a higher saturation than the first threshold and the largest number of pixels in the non-subject region.

The comparison unit 10 compares the first pixel count ratio Pr1 to a second threshold. The comparison unit 10 also compares the number of skin-colored pixels S1 to a third threshold and the number of sky-colored pixels S2 to a fourth threshold. The comparison results are output to the saturation correction parameter calculation unit 11. The second threshold, third threshold, and fourth threshold take preset values.

The saturation correction parameter calculation unit 11 calculates a saturation emphasis coefficient on the basis of the comparison results obtained by the comparison unit 10. The saturation emphasis coefficient is a coefficient for modifying the saturation of the subject region and the non-subject region. As will be described in detail below, when the saturation emphasis coefficient is larger than 1.0, the saturation is emphasized, and when the saturation emphasis coefficient is smaller than 1.0, the saturation is suppressed. When the saturation emphasis coefficient is 1.0, the saturation is not corrected. The saturation emphasis coefficient is calculated on the basis of FIG. 7, for example. When the first pixel count ratio Pr1 is equal to or larger than the second threshold, the saturation emphasis coefficient is 1.2, and when the first pixel count ratio Pr1 is smaller than the second threshold, the saturation emphasis coefficient is 0.8.

When calculating the saturation emphasis coefficient, the values of the number of skin-colored pixels S1 and the number of sky-colored pixels S2 in the subject region are calculated preferentially over the first pixel count ratio Pr1. The number of skin-colored pixels S1 is calculated particularly preferentially. More specifically, when the number of skin-colored pixels S1 is equal to or larger than the third threshold, the saturation emphasis coefficient is set at 1.0 regardless of the value of the first pixel count ratio Pr1. Further, when the number of skin-colored pixels S1 is smaller than the third threshold and the number of sky-colored pixels S2 is equal to or larger than the fourth threshold, the saturation emphasis coefficient is set at 1.2. In other words, the saturation emphasis coefficient is calculated on the basis of the value of the first pixel count ratio Pr1 only when the number of skin-colored pixels S1 is smaller than the third threshold and the number of sky-colored pixels S2 is smaller than the fourth threshold.

In this embodiment, the number of skin-colored pixels S1 is calculated with maximum priority, but this invention is not limited thereto, and the first pixel count ratio Pr1, for example, may be calculated preferentially.

Figure 8:
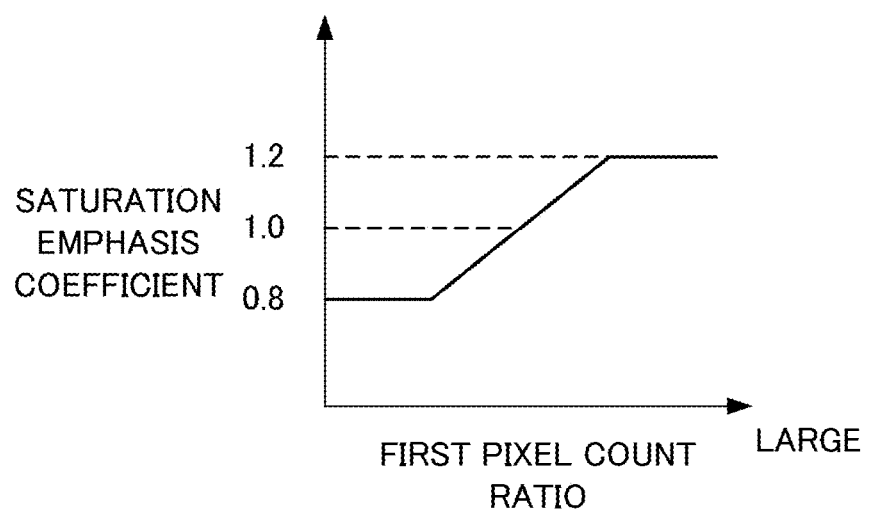
FIG. 8 is a map used to calculate the saturation emphasis coefficient.

It should be noted that the saturation emphasis coefficient may be calculated on the basis of a continuous function, as shown in FIG. 8, for example. FIG. 8 is a function showing a relationship between the first pixel count ratio Pr1 and the saturation emphasis coefficient. When the first pixel count ratio Pr1 increases, or in other words when the number of pixels of a predetermined hue is large, the saturation emphasis coefficient increases. By calculating the saturation emphasis coefficient in accordance with the first pixel count ratio Pr1, an image in which the saturation is corrected in accordance with the image characteristic amount of the subject region and the non-subject region can be obtained.

Figure 9:
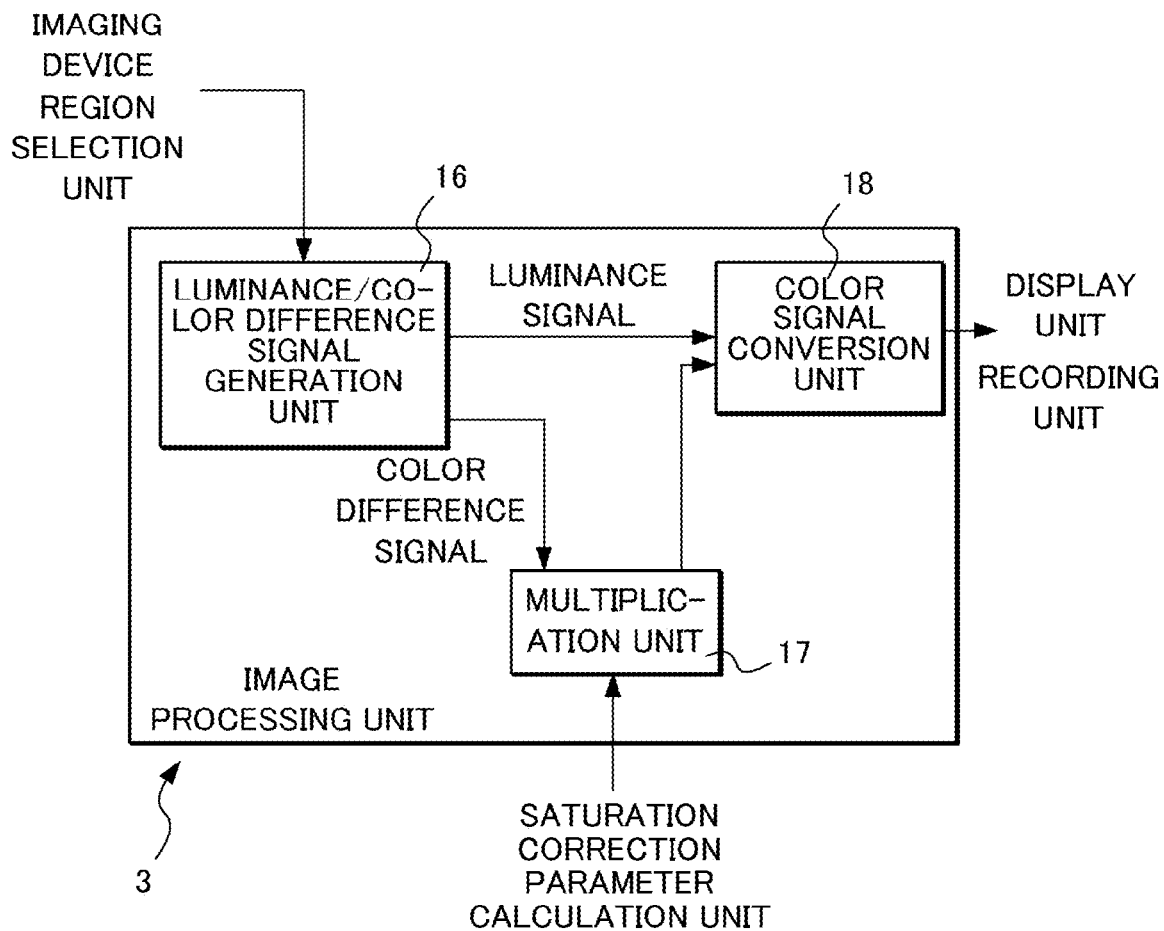
FIG. 9 is a schematic block diagram showing an image processing unit according to the first embodiment.

Returning to FIG. 1, the image processing unit 3 will be described using FIG. 9. FIG. 9 is a schematic block diagram showing the image processing unit 3.

The image processing unit 3 comprises a luminance/color difference signal generation unit 16, a multiplication unit 17, and a color signal conversion unit 18.

The luminance/color difference signal generation unit 16 converts RGB signals of the image data obtained by the imaging device 1 into a luminance signal Y and color difference signals Cb, Cr. The color difference signals Cb, Cr generated by the luminance/color difference signal generation unit 16 are output to the multiplication unit 17.

The multiplication unit 17 corrects the color difference signals Cb, Cr generated by the luminance/color difference signal generation unit 16 using the saturation emphasis coefficient calculated by the saturation correction parameter calculation unit 11. Here, correction is performed by multiplying the saturation emphasis coefficient by the color difference signals Cb, Cr. Corrected color difference signals Cb', Cr' are calculated using Equations (1) and (2).

$$Cb' = Cb \times \text{saturation emphasis coefficient} \quad \text{Equation (1)}$$

$$Cr' = Cr \times \text{saturation emphasis coefficient} \quad \text{Equation (2)}$$

The color signal conversion unit 18 generates RGB signals on the basis of the luminance signal Y and the corrected color difference signals Cb', Cr'.

By correcting the color difference signals Cb, Cr using the saturation emphasis coefficient, an image having a modified saturation can be obtained. In other words, an image having adjusted characteristics such as the saturation (second image characteristic amount), for example, can be obtained. When the saturation emphasis coefficient is larger than 1.0, correction is performed such that the overall saturation of the image increases, and as a result, the main object in the subject region can be made more distinctive.

Returning to FIG. 1, the image pickup control unit 6 is connected to the imaging device 1, the image analysis unit 2, the image processing unit 3, and so on, and controls the image pickup device including these components. The image pickup control unit 6 is constituted by a CPU, a ROM, a RAM, and so on. The ROM stores a control program and various data. The CPU executes calculations on the basis of the control program stored in the ROM to activate respective functions of the image pickup control unit 6.

The display unit 4 displays an image subjected to saturation correction by the image processing unit 3, for example. The recording unit 5 stores image data subjected to saturation correction by the image processing unit 3, for example.

It should be noted that the saturation emphasis coefficient of the subject region and the saturation emphasis coefficient of the non-subject region may be calculated separately such that different corrections are performed on the subject region and the non-subject region.

Effects of the first embodiment of this invention will now be described.

The subject region including the main object and the non-subject region not including the subject region are set, whereupon the image characteristic amount of the subject region, i.e. the pixel count of the hue having a higher saturation than the first threshold and the largest number of pixels in the subject region, and the image characteristic amount of the non-subject region, i.e. the pixel count of the hue having a higher saturation than the first threshold and the largest number of pixels in the non-subject region, are tabulated. The first pixel count ratio Pr1 is then calculated by comparing the image characteristic amount of the subject region with the image characteristic amount of the non-subject region, whereupon the saturation emphasis coefficient is calculated on the basis of the first pixel count ratio Pr1. The saturation can then be modified by correcting the color difference signals Cr, Cb using the saturation emphasis coefficient. For example, when a main object having a higher image characteristic amount than the non-subject region exists in the subject region, the main object in the subject region can be made more distinctive by emphasizing the overall saturation of the image.

Next, a second embodiment of this invention will be described.

An image analysis unit 20 and an image processing unit 21 of the image pickup device according to this embodiment differ from their counterparts in the first embodiment. Here, the image analysis unit 20 and the image processing unit 21 will be described. Constitutions of the image analysis unit 20 and the image processing unit 21 which are identical to those of the first embodiment have been allocated identical reference numerals to the first embodiment and description thereof has been omitted.

Figure 10:
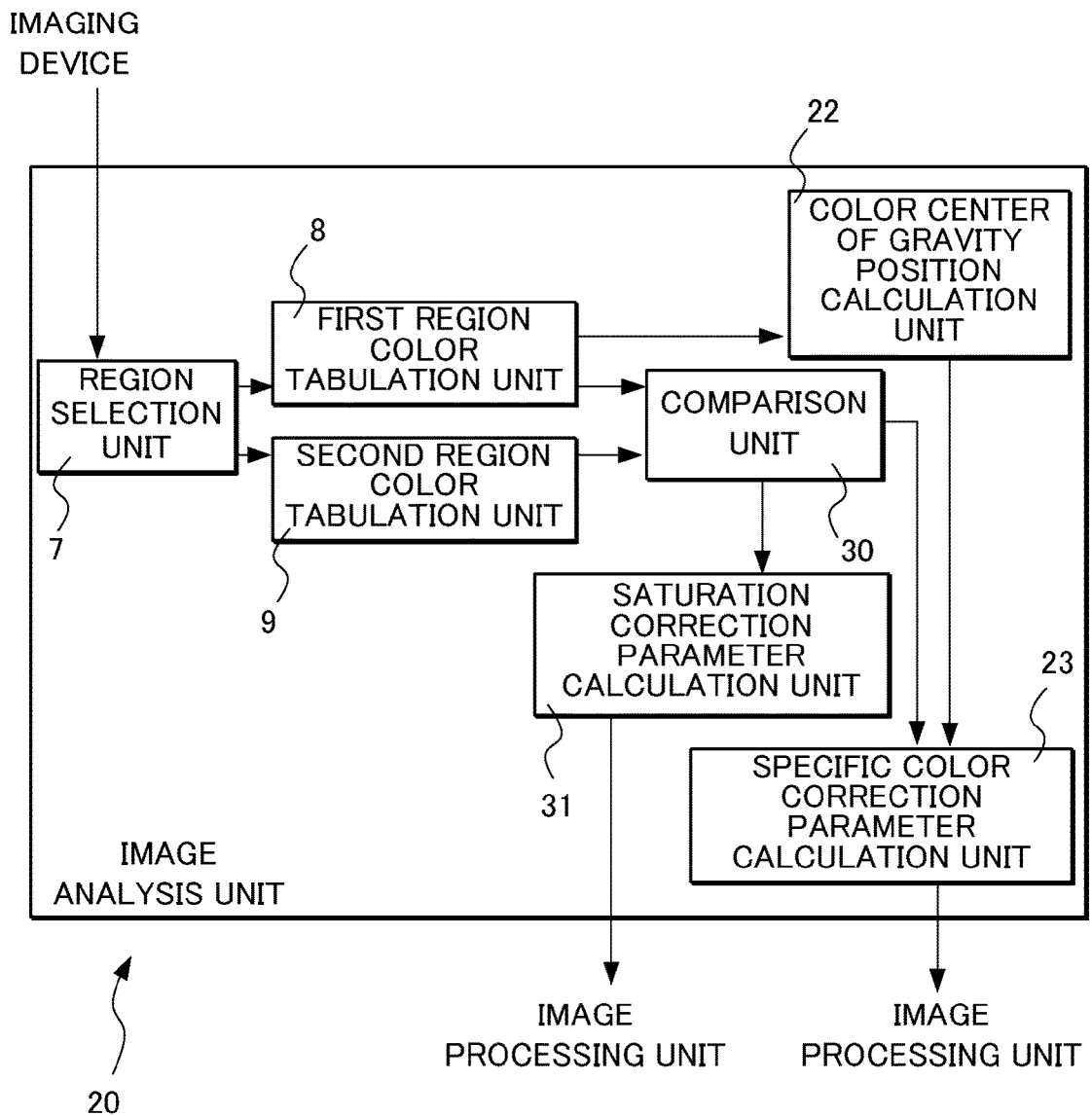
FIG. 10 is a schematic block diagram showing an image analysis unit according to a second embodiment.

The image analysis unit 20 will be described using FIG. 10. FIG. 10 is a schematic block diagram showing the image analysis unit 20.

The image analysis unit 20 comprises the region selection unit 7, the first region color tabulation unit 8, the second region color tabulation unit 9, a color center of gravity position calculation unit 22, a comparison unit 30, a specific color correction parameter calculation unit (color correction region setting unit) 23, and a saturation correction parameter calculation unit 31.

The color center of gravity position calculation unit 22 calculates a color center of gravity position in relation to the hue having a higher saturation than the first threshold and the largest number of pixels on the basis of the tabulation result obtained by the first region color tabulation unit 8 in relation to the image characteristic amount of the subject region. The color center of gravity position is a center of chromaticity coordinates relating to the hue having a higher saturation than the first threshold and the largest number of pixels. The color center of gravity position is determined by calculating a color average of the pixels belonging to the hue having a higher saturation than the first threshold and the largest number of pixels. For example, the color center of gravity position is determined by adding together pixel values of the pixels belonging to the hue having a higher saturation than the first threshold and the largest number of pixels and dividing the added value by a total pixel count of the subject region. The color center of gravity position is output to the specific color correction parameter calculation unit 23 as a correction center color for correcting a specific color of the image.

The comparison unit 30 calculates, in addition to the first pixel count ratio Pr1, a second pixel count ratio Pr2 (=Max (Ki)/Total (Ki)), which is a ratio between the pixel count Max (Ki) of the hue having a higher saturation than the first threshold and the largest number of pixels in the subject region and a total pixel count Total (Ki) of all hues (red, purple, blue, cyan, green, yellow) in the subject region. The second pixel count ratio Pr2 is used to determine whether or not color of pixels in the subject region places a disproportionate emphasis on a specific color. When the second pixel count ratio Pr2 is large, a large number of pixels of a specific color exist in the subject region. The comparison unit 30 also calculates a third pixel count ratio Pr3 (=Max (Ki)/S1), which is a ratio between the pixel count Max (Ki) of the hue having a higher saturation than the first threshold and the largest number of pixels in the subject region and the number of skin-colored pixels S1.

The comparison unit 30 compares the second pixel count ratio Pr2 to a fifth threshold. Further, the comparison unit 30 compares the third pixel count ratio Pr3 to a sixth threshold. The comparison results are output to the specific color correction parameter calculation unit 23 and the saturation correction parameter calculation unit 31. The fifth threshold and the sixth threshold take preset values.

The specific color correction parameter calculation unit 23 calculates a specific color saturation emphasis coefficient on the basis of the comparison results obtained by the comparison unit 30. The saturation emphasis coefficient is a coefficient for correcting the overall saturation of the image, whereas the specific color saturation emphasis coefficient is a coefficient for correcting a part of the colors of the image.

The specific color saturation emphasis coefficient is calculated on the basis of FIG. 11. For example, when the first pixel count ratio Pr1 is equal to or larger than the second threshold and the second pixel count ratio Pr2 is equal to or larger than the fifth threshold, the specific color saturation emphasis coefficient is 1.2.

Further, the specific color correction parameter calculation unit 23 calculates a first color correction amount and a color correction region on the basis of the color center of gravity position and the specific color saturation emphasis coefficient. The first color correction amount indicates a correction amount to be applied to a color belonging to the color correction region. As will be described in detail below, the first color correction amount is weighted, and a part of the colors of the image is corrected using a second color correction amount obtained from the weighting.

The first color correction amount is calculated using Equation (3).

First color correction amount=(specific color saturation emphasis coefficient×color center of gravity position)−color center of gravity position    Equation (3)

The color correction region is calculated using Equation (4).

Color correction region=color center of gravity position±α    Equation (4)

Figure 12:
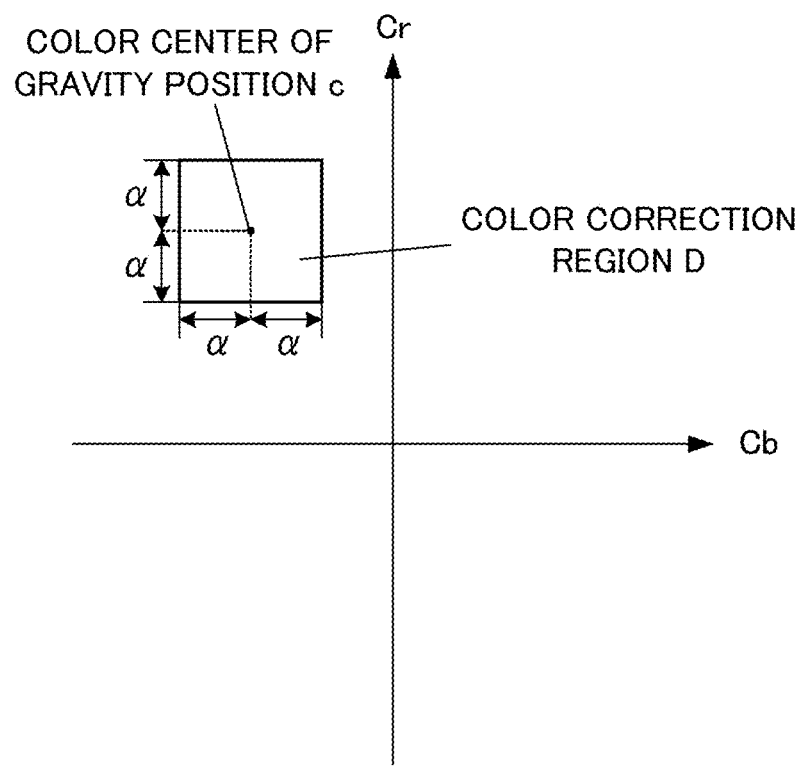
FIG. 12 is a view illustrating a color correction region according to the second embodiment.

Here, α is a preset value for preventing color jump, for example. As shown in FIG. 12, for example, when a color center of gravity position c is calculated, a color correction region D is calculated. The color correction region indicates a range of the color to be subjected to color correction centering on the color center of gravity position. It should be noted that α may be set to have different values on a Cb axis and a Cr axis with regard to the color coordinates shown in FIG. 12.

The saturation correction parameter correction unit 31 calculates the saturation emphasis coefficient on the basis of the comparison results obtained by the comparison unit 30. The saturation emphasis coefficient is calculated on the basis of FIG. 11. For example, when the first pixel count ratio Pr1 is equal to or larger than the second threshold and the second pixel count ratio Pr2 is smaller than the fifth threshold, the saturation emphasis coefficient is 1.2. Similarly to the first embodiment, with regard to the saturation emphasis coefficient, the number of skin-colored pixels S1 and the number of sky-colored pixels S2 are prioritized over the first pixel count ratio Pr1.

Figure 13:
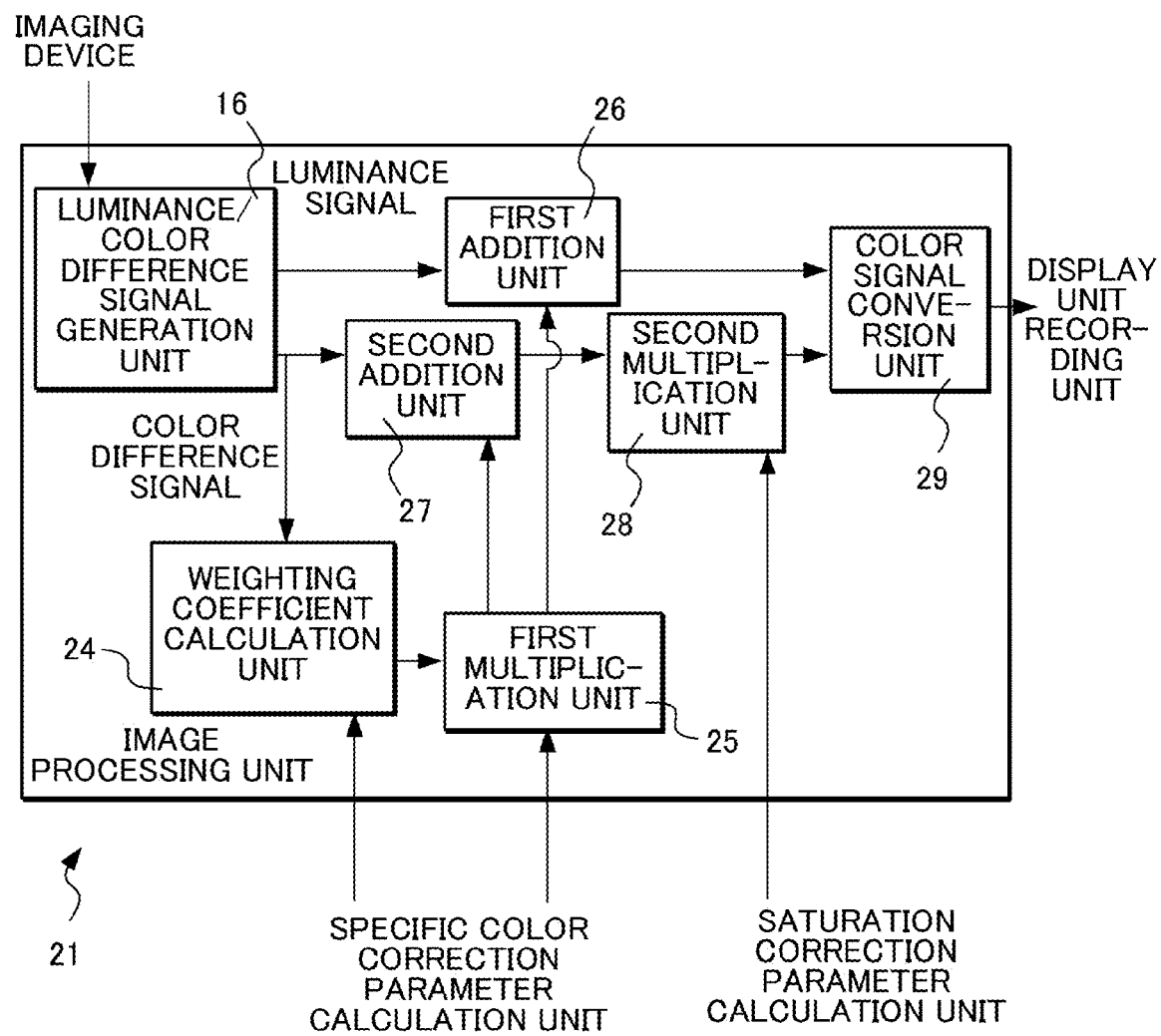
FIG. 13 is a schematic block diagram showing an image processing unit according to the second embodiment.

The image processing unit 21 will now be described using FIG. 13. FIG. 13 is a schematic block diagram showing the image processing unit 21.

The image processing unit 21 comprises the luminance/color difference signal generation unit 16, a weighting coefficient calculation unit (weighting calculation unit) 24, a first multiplication unit (color correction amount setting unit) 25, a first addition unit (specific color correction unit) 26, a second addition unit (specific color correction unit) 27, a second multiplication unit 28, and a color signal conversion unit 29.

The weighting coefficient calculation unit 24 calculates a weighting coefficient on the basis of the color correction region calculated by the specific color correction parameter calculation unit 23. The weighting coefficient is a coefficient for weighting a corrected color. The weighting coefficient is 1 in the color center of gravity position and zero on the outside of the color correction region. In the color correction region, the weighting coefficient decreases gradually from the color center of gravity position toward a boundary of the color correction region. For example, when the color center of gravity position c and the color correction region D are set as shown in FIG. 12, the weighting coefficient of the color center of gravity position c is 1. Further, in the color correction region D, the weighting coefficient gradually decreases toward colors further away from the color center of gravity position c with respect to the color coordinates centering on the color center of gravity position c. On the outside of the color correction region D, the weighting coefficient is zero.

The first multiplication unit 25 calculates the second color correction amount (color correction amount) by multiplying the weighting coefficient calculated in the weighting coefficient calculation unit 24 by the first color correction amount calculated in the specific color correction parameter calculation unit 23.

The first addition unit 26 adds the second color correction amount to the luminance signal Y generated by the luminance/color difference signal generation unit 16.

The second addition unit 27 adds the second color correction amount to the color difference signals Cb, Cr generated by the luminance/color difference signal generation unit 16.

The weighting coefficient is multiplied by the first color correction amount in the first multiplication unit 25, and therefore when the weighting coefficient is zero, the second color correction amount is zero. In other words, colors outside of the color correction region are not subjected to color correction by the first addition unit 26 and second addition unit 27. When the weighting coefficient is not zero, on the other hand, or in other words with respect to a color belonging to the color correction region, the second color correction amount is calculated in accordance with the weighting coefficient. The second color correction amount is then added to the luminance signal Y and the color difference signals Cb, Cr by the first addition unit 26 and second addition unit 27, whereby color correction is performed in relation to a specific color.

Here, when the specific color saturation emphasis coefficient is larger than 1.0, absolute values of the luminance signal Y and the color difference signals Cr, Cb of a color belonging to the color correction region are both amplified by the first addition unit 26 and second addition unit 27 in accordance with the first color correction amount calculated in Equation (4). The specific color saturation emphasis coefficient is larger than 1.0 when the first pixel count ratio Pr1 is equal to or larger than the second threshold and the second pixel count ratio Pr2 is equal to or larger than the fifth threshold, for example. In other words, when the image characteristic amount is biased toward a certain hue in the subject region, correction is performed over the entire image to emphasize colors close to that hue. In this case, colors having a large number of hues are emphasized in the subject region, and therefore the main object can be made more distinctive.

When the specific color saturation emphasis coefficient is 1.0, on the other hand, the first color correction amount is zero. In this case, the second color correction amount is also zero, and therefore the luminance signal Y and color difference signals Cr, Cb are not corrected by the first addition unit 26 and second addition unit 27. In other words, correction is not performed in relation to a specific color.

Further, when the specific color saturation emphasis coefficient is smaller than 1.0, the absolute values of the luminance signal Y and the color difference signals Cr, Cb of a color belonging to the color correction region are reduced by the first addition unit 26 and second addition unit 27 in accordance with the first color correction amount calculated in Equation (4). In other words, correction is performed over the entire image such that colors close to a certain hue are suppressed.

As described above, by calculating the specific color saturation emphasis coefficient and the weighting coefficient and performing color correction on the basis of these values, colors in the color correction region, or in other words specific colors, can be corrected.

The second multiplication unit 28 corrects the color difference signals Cb, Cr output from the second addition unit 27 using the saturation emphasis coefficient.

The color signal conversion unit 29 generates RGB signals on the basis of the luminance signal Y output from the first addition unit 26 and the color difference signals Cr', Cb' output from the second multiplication unit 28.

In this embodiment, the luminance signal Y and color difference signals Cr, Cb are corrected by the second color correction amount. However, the lightness may be corrected in accordance with the corrected color. Further, the saturation and the hue are used as the image characteristics, but another image characteristic such as an edge detection amount may be used instead. Moreover, the saturation is emphasized as a method of making the main object distinctive, but other emphasis processing such as edge emphasis may be performed instead.

Effects of the second embodiment of this invention will now be described.

By setting the color center of gravity position and the color correction region and correcting the colors belonging to the color correction region, specific colors of the image can be corrected. For example, when the image characteristic amount is biased toward a certain hue in the subject region, it is possible to emphasize only the colors close to that hue, and as a result, the main object can be made more distinctive. Further, when skin color is included in the main object, for example, the colors of the skin-colored part of the image can be left as is, thereby making the main object more distinctive.

Furthermore, by performing color correction after applying a weighting to the color correction region centering on the color center of gravity position, the color correction can be performed smoothly.

Next, a third embodiment of this invention will be described.

In the image pickup device according to this embodiment, an image analysis unit 40 and an image processing unit 41 differ from their counterparts in the first embodiment. Here, the image analysis unit 40 and the image processing unit 41 will be described. Constitutions of the image analysis unit 40 and the image processing unit 41 which are identical to those of the first embodiment have been allocated identical reference numerals to the first embodiment and description thereof has been omitted.

Figure 14:
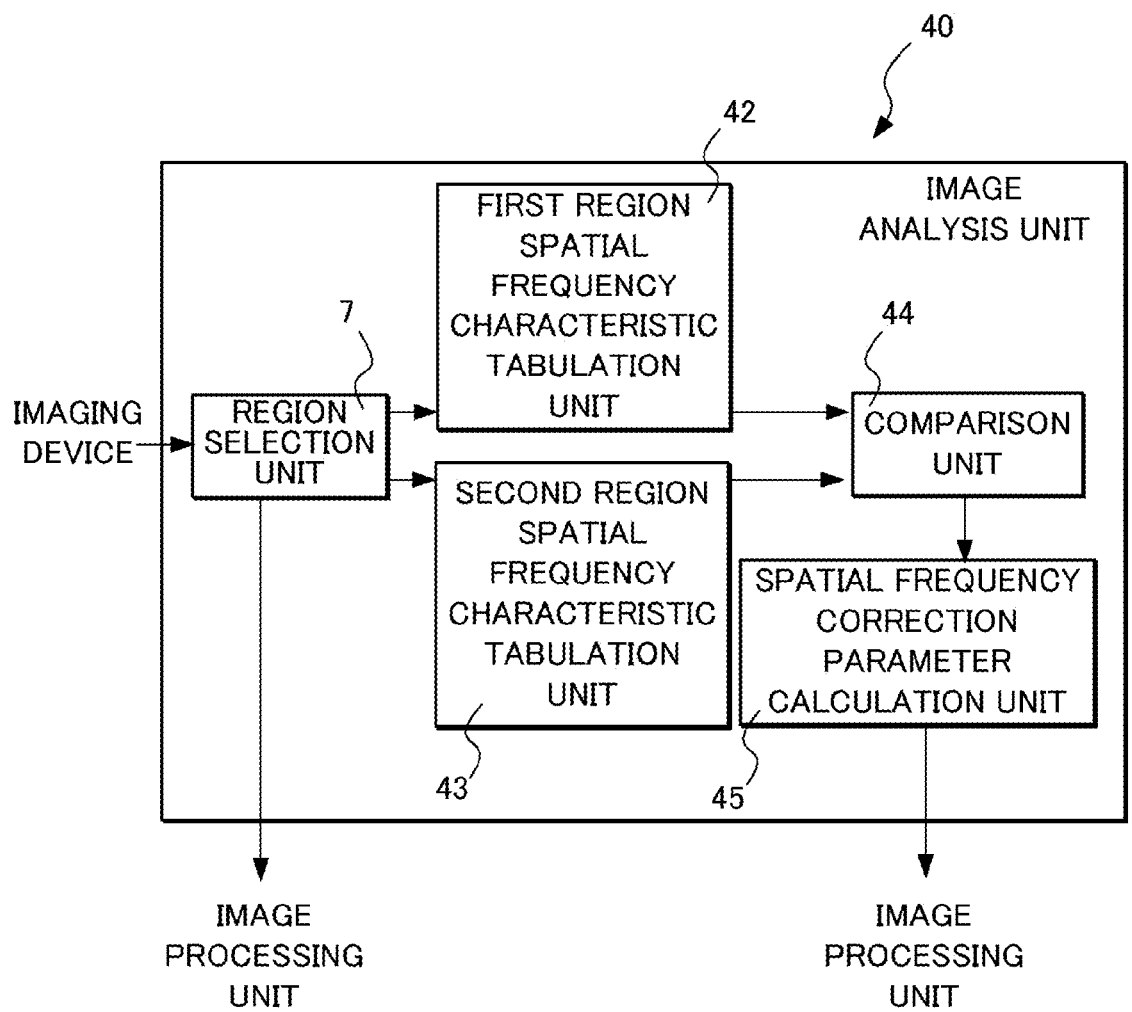
FIG. 14 is a schematic block diagram showing an image analysis unit according to a third embodiment.

The image analysis unit 40 will be described using FIG. 14. FIG. 14 is a schematic block diagram showing the image analysis unit 40.

The image analysis unit 40 comprises the region selection unit 7, a first region spatial frequency characteristic tabulation unit 42, a second region spatial frequency characteristic tabulation unit 43, a comparison unit 44, and a spatial frequency correction parameter calculation unit (correction coefficient calculation unit) 45.

Figure 15:
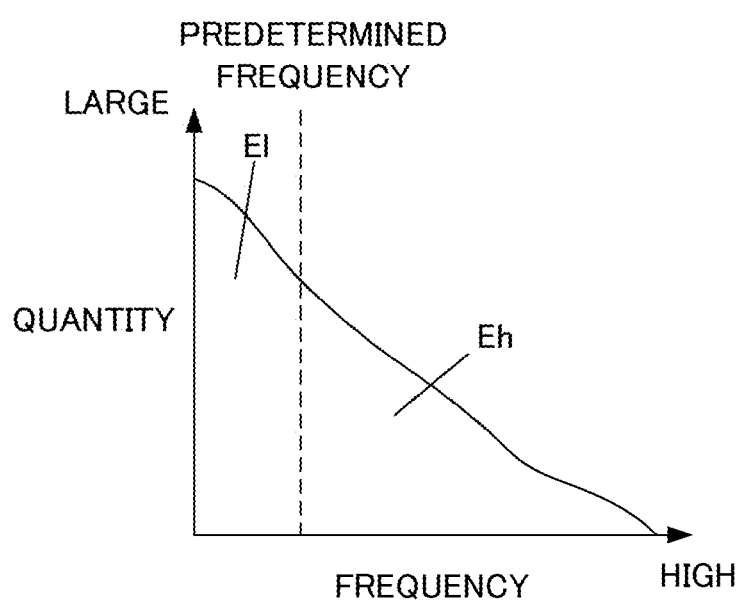
FIG. 15 is a view illustrating a first integrated value and a second integrated value according to the third embodiment.

The first region spatial frequency characteristic tabulation unit 42 tabulates a spatial frequency distribution of the subject region from the image data. In this embodiment, frequency information is used as the image characteristic. Here, as shown in FIG. 15, quantities of frequencies equal to or higher than a predetermined frequency is integrated from a relationship between the frequencies of the subject region and the quantities of each frequency. The first region spatial frequency characteristic tabulation unit 42 calculates a first integrated value Eh, which is an integrated value of the quantities of frequencies equal to or higher than the predetermined frequency in FIG. 15, and a second integrated value El, which is an integrated value of the quantities of frequencies smaller than the predetermined frequency.

Figure 16:
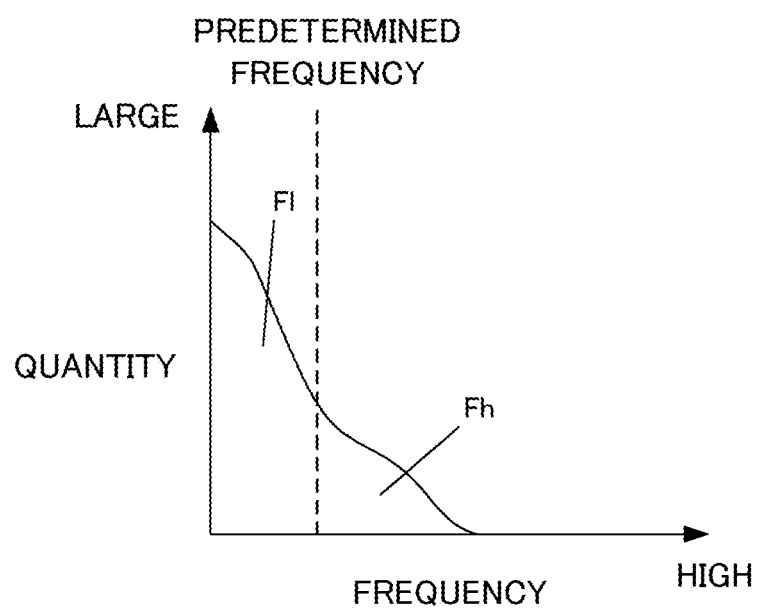
FIG. 16 is a view illustrating a third integrated value and a fourth integrated value according to the third embodiment.

The second region spatial frequency characteristic tabulation unit 43 tabulates the spatial frequency distribution of the non-subject region from the image data. Here, as shown in FIG. 16, quantities of frequencies equal to or higher than a predetermined frequency is integrated from a relationship between the frequencies of the non-subject region and the quantities of each frequency. The second region spatial frequency characteristic tabulation unit 43 calculates a third integrated value Fh, which is an integrated value of the quantities of frequencies equal to or higher than the predetermined frequency in FIG. 16, and a fourth integrated value Fl, which is an integrated value of the quantities of frequencies smaller than the predetermined frequency.

The comparison unit 44 calculates an integrated value ratio (I) (=Eh/Fh), which is a ratio between the first integrated value Eh and the third integrated value Fh. Further, the comparison unit 44 compares the integrated value ratio (I) with a seventh threshold. The seventh threshold takes a preset value. The comparison result is output to the spatial frequency correction parameter calculation unit 45.

The spatial frequency correction parameter calculation unit 45 calculates a spatial frequency correction coefficient on the basis of the comparison result from the comparison unit 44. The spatial frequency correction coefficient is an edge emphasis coefficient and a blurring processing coefficient. In other words, the spatial frequency correction parameter calculation unit 45 calculates an edge emphasis coefficient and a blurring processing coefficient. The edge emphasis coefficient and blurring processing coefficient are calculated on the basis of FIG. 17. For example, when the integrated value ratio (I) is equal to or larger than the seventh threshold, the edge emphasis coefficient and the blurring processing coefficient in the subject region are 2.0 and 1.0, respectively.

Figure 18:
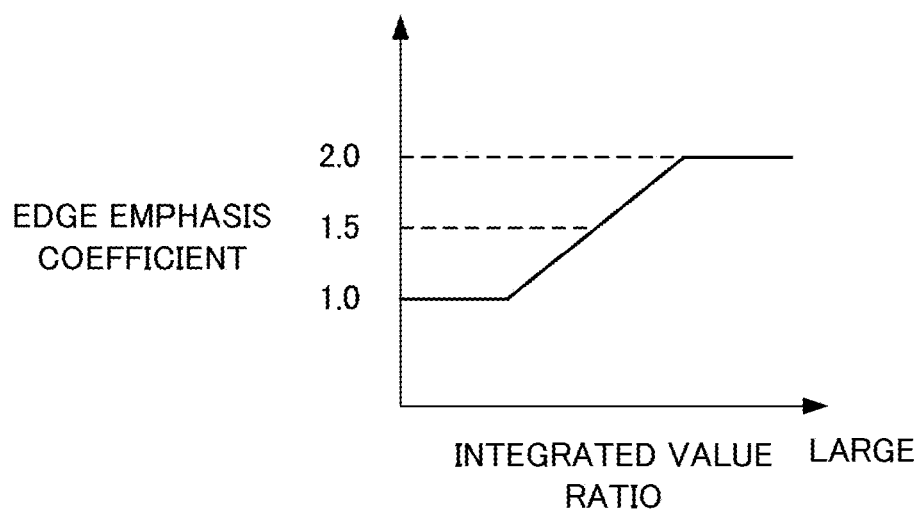
FIG. 18 is a map used to calculate the edge emphasis coefficient by another method according to the third embodiment.

It should be noted that the edge emphasis coefficient may be calculated on the basis of a continuous function, as shown in FIG. 18, for example. FIG. 18 is a function showing a relationship between the integrated value ratio (I) in the subject region and the edge emphasis coefficient. When the integrated value ratio (I) increases in the subject region, the edge emphasis coefficient increases.

Figure 19:
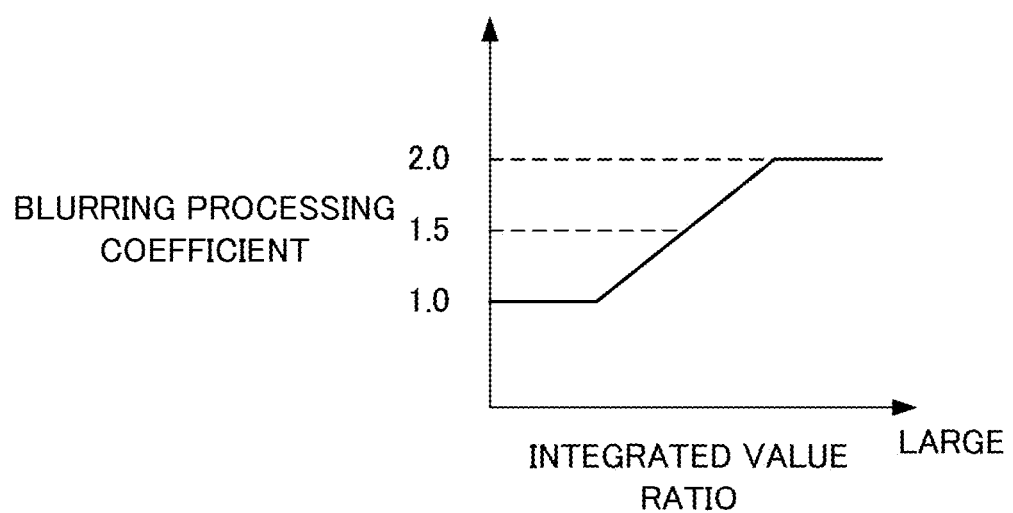
FIG. 19 is a map used to calculate the blurring processing coefficient by another method according to the third embodiment.

The blurring processing coefficient may also be calculated on the basis of a continuous function, as shown in FIG. 19, for example. FIG. 19 is a function showing a relationship between the integrated value ratio (I) in the non-subject region and the blurring processing coefficient. When the integrated value ratio (I) increases in the non-subject region, the blurring processing coefficient increases.

Figure 20:
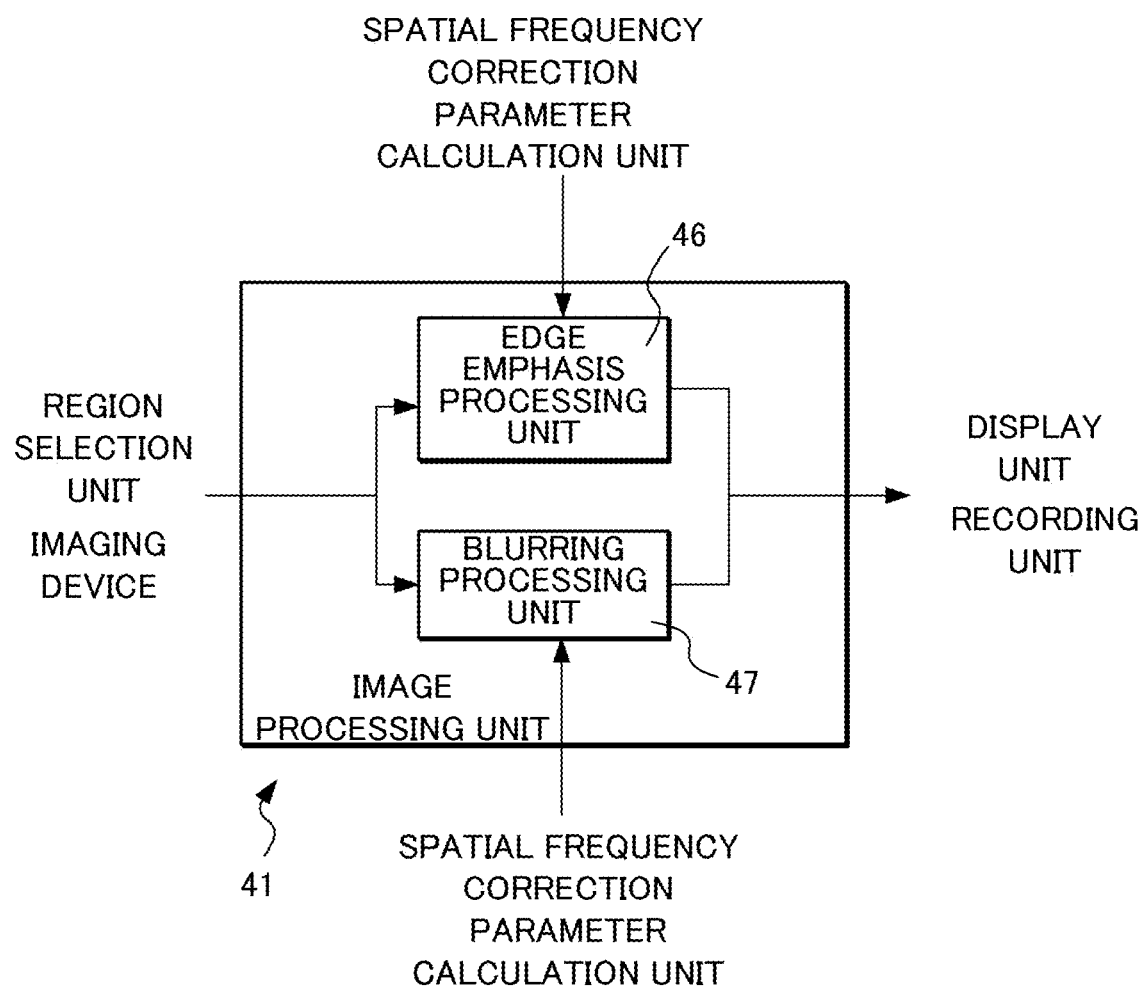
FIG. 20 is a schematic block diagram showing an image processing unit according to the third embodiment.

The image processing unit 41 will now be described using FIG. 20. FIG. 20 is a schematic block diagram showing the image processing unit 41.

The image processing unit 41 comprises an edge emphasis processing unit 46 and a blurring processing unit 47.

The edge emphasis processing unit 46 performs edge emphasis processing on the subject region and the non-subject region on the basis of the edge emphasis coefficient calculated by the spatial frequency correction parameter calculation unit 45. The edge emphasis processing unit 46 performs edge emphasis using a Laplacian filter. The edge emphasis processing is performed with greater intensity as the edge emphasis coefficient increases so that the edges of the image are emphasized. It should be noted that the edge emphasis processing unit 46 may perform edge emphasis using a difference filter or the like rather than a Laplacian filter.

The blurring processing unit 47 performs blurring processing on the subject region and the non-subject region on the basis of the blurring processing coefficient calculated by the spatial frequency correction parameter calculation unit 45. The blurring processing unit 47 performs the blurring processing using a Gauss filter. The burring processing is performed with greater intensity as the blurring processing coefficient increases so that the image is blurred. It should be noted that the blurring processing unit 47 may perform the blurring processing using a low-pass filter or the like rather than a Gauss filter.

The image processing unit 41 performs edge emphasis processing and blurring processing on the RGB signals. As a result, an image having adjusted characteristics such as edges, for example, can be obtained.

In this embodiment, when the spatial frequency of the subject region is high and the spatial frequency of the non-subject region is low, for example, the edge emphasis coefficient of the subject region increases and the blurring processing coefficient of the non-subject region increases. As a result, an image having a distinctive main object can be obtained.

Effects of the third embodiment of this invention will now be described.

The integrated value ratio (I) is calculated by comparing the frequency information of the subject region and the frequency information of the non-subject region, whereupon the edge emphasis coefficient and the blurring emphasis coefficient are calculated with regard to the subject region and the non-subject region, respectively, on the basis of the integrated value ratio (I). Edge emphasis processing and blurring emphasis processing are then performed on the subject region and the non-subject region on the basis of the respective edge emphasis coefficients and the respective blurring emphasis coefficients. Hence, edge emphasis processing and blurring emphasis processing can be performed appropriately on the subject region and the non-subject region, respectively. For example, when the spatial frequency of the subject region is high and the spatial frequency of the non-subject region is low, edge emphasis processing is performed in the subject region and blurring emphasis processing is performed in the non-subject region. As a result, the main object in the subject region can be made more distinctive.

Next, a fourth embodiment of this invention will be described.

The fourth embodiment of this invention relates to an image pickup device having the features of the first embodiment and the third embodiment. Here, an image analysis unit 50 and an image processing unit 51 will be described.

Figure 21:
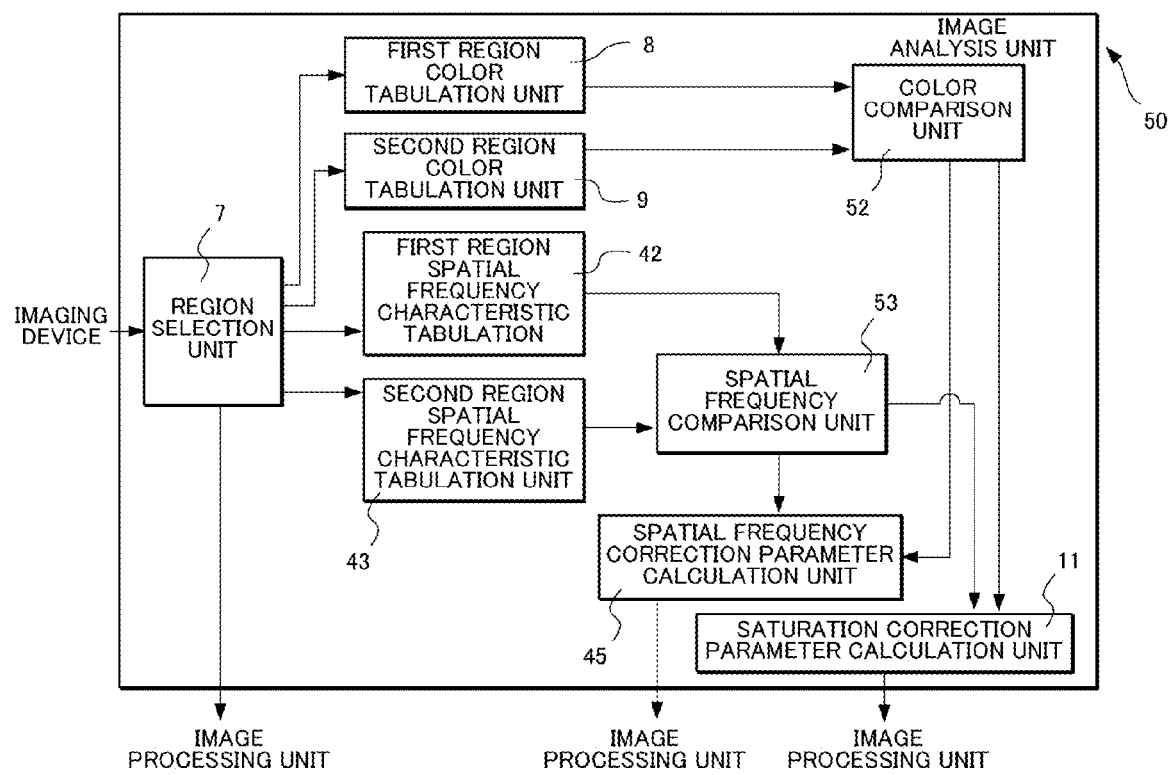
FIG. 21 is a schematic block diagram showing an image analysis unit according to a fourth embodiment.

The image analysis unit 50 will be described using FIG. 21. FIG. 21 is a schematic block diagram showing the image analysis unit 50.

The image analysis unit 50 comprises the region selection unit 7, the first region color tabulation unit 8, the second region color tabulation unit 9, a color comparison unit 52, the first region spatial frequency characteristic tabulation unit 42, the second region spatial frequency characteristic tabulation unit 43, a spatial frequency comparison unit 53, the saturation correction parameter calculation unit 11, and the spatial frequency correction parameter calculation unit 45.

The color comparison unit 52 is constituted identically to the comparison unit 10 of the first embodiment, and therefore description thereof is omitted here. Further, the spatial frequency comparison unit 53 is constituted identically to the comparison unit 44 of the third embodiment, and therefore description thereof is omitted here.

The saturation correction parameter calculation unit 11 calculates the saturation emphasis coefficient on the basis of the comparison result obtained by the color comparison unit 52 and the comparison result obtained by the spatial frequency comparison unit 53. The spatial frequency correction parameter calculation unit 45 calculates the edge emphasis coefficient and the blurring processing coefficient on the basis of the comparison result obtained by the color comparison unit 52 and the comparison result obtained by the spatial frequency comparison unit 53. The saturation emphasis coefficient, edge emphasis coefficient, and blurring processing coefficient are calculated on the basis of FIG. 22. For example, when the first pixel count ratio Pr1 is equal to or larger than the second threshold and the integrated value ratio (I) is equal to or larger than the seventh threshold, the saturation emphasis coefficient, the edge emphasis coefficient, and the blurring processing coefficient in the subject region are 2.0, 2.0, and 1.0, respectively. In the non-subject region, meanwhile, the saturation emphasis coefficient, the edge emphasis coefficient, and the blurring processing coefficient are 0.5, 1.0, and 2.0, respectively. It should be noted that the saturation emphasis coefficient, the edge emphasis coefficient, and the blurring processing coefficient are not limited to the values shown in FIG. 22.

Figure 23:
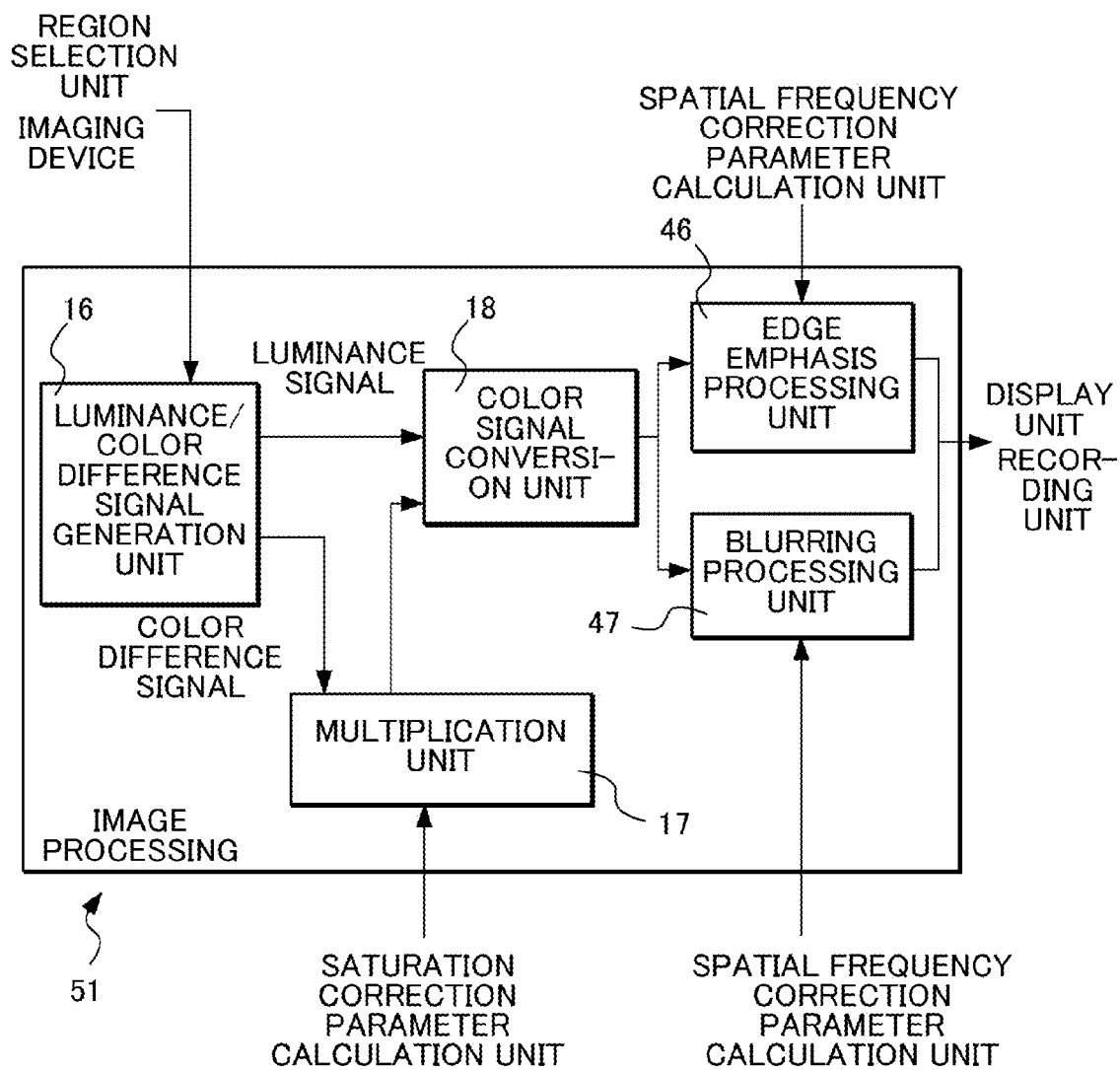
FIG. 23 is a schematic block diagram showing an image processing unit according to the fourth embodiment.

The image processing unit 51 will now be described using FIG. 23. FIG. 23 is a schematic block diagram showing the image processing unit 51.

The image processing unit 51 comprises the luminance/color difference signal generation unit 16, the multiplication unit 17, the color signal conversion unit 18, the edge emphasis processing unit 46, and the blurring processing unit 47.

The image processing unit 51 corrects the saturation of the subject region by correcting the color difference signals in the multiplication unit 17, and then performs edge emphasis in the edge emphasis processing unit 46 and blurring processing in the blurring processing unit 47.

Effects of the fourth embodiment of this invention will now be described.

Correction is performed on the basis of the image characteristic amount and the spatial frequency, and therefore image processing can be performed appropriately in accordance with the state of the main object. As a result, the main object can be made distinctive effectively and accurately. For example, when the saturation of the subject region is high and the spatial frequency is also high, it may be determined that the main object is an object having a high saturation and a detailed structure. Therefore, saturation emphasis processing and edge emphasis processing for clearly defining the structure of the main object are performed in the subject region, and blurring processing is performed in the non-subject region. As a result, an image in which the structure of the main object is clearly defined can be obtained. Further, when the saturation of the subject region is high and the spatial frequency is low, it may be determined that the main object is an object having a high saturation and a smooth structure. Therefore, by implementing only saturation emphasis on the subject region, a distinctive image can be obtained without damaging the smooth structure of the object.

Further, by performing edge emphasis and blurring processing after correcting the saturation of the subject region, the edge emphasis and blurring processing can be performed effectively.

Next, a fifth embodiment of this invention will be described.

In the image pickup device according to this embodiment, an image analysis unit 60 differs from that of the second embodiment. Here, the image analysis unit 60 will be described. Constitutions of the image analysis unit 60 which are identical to those of the second embodiment have been allocated identical reference numerals to the second embodiment and description thereof has been omitted.

Figure 24:
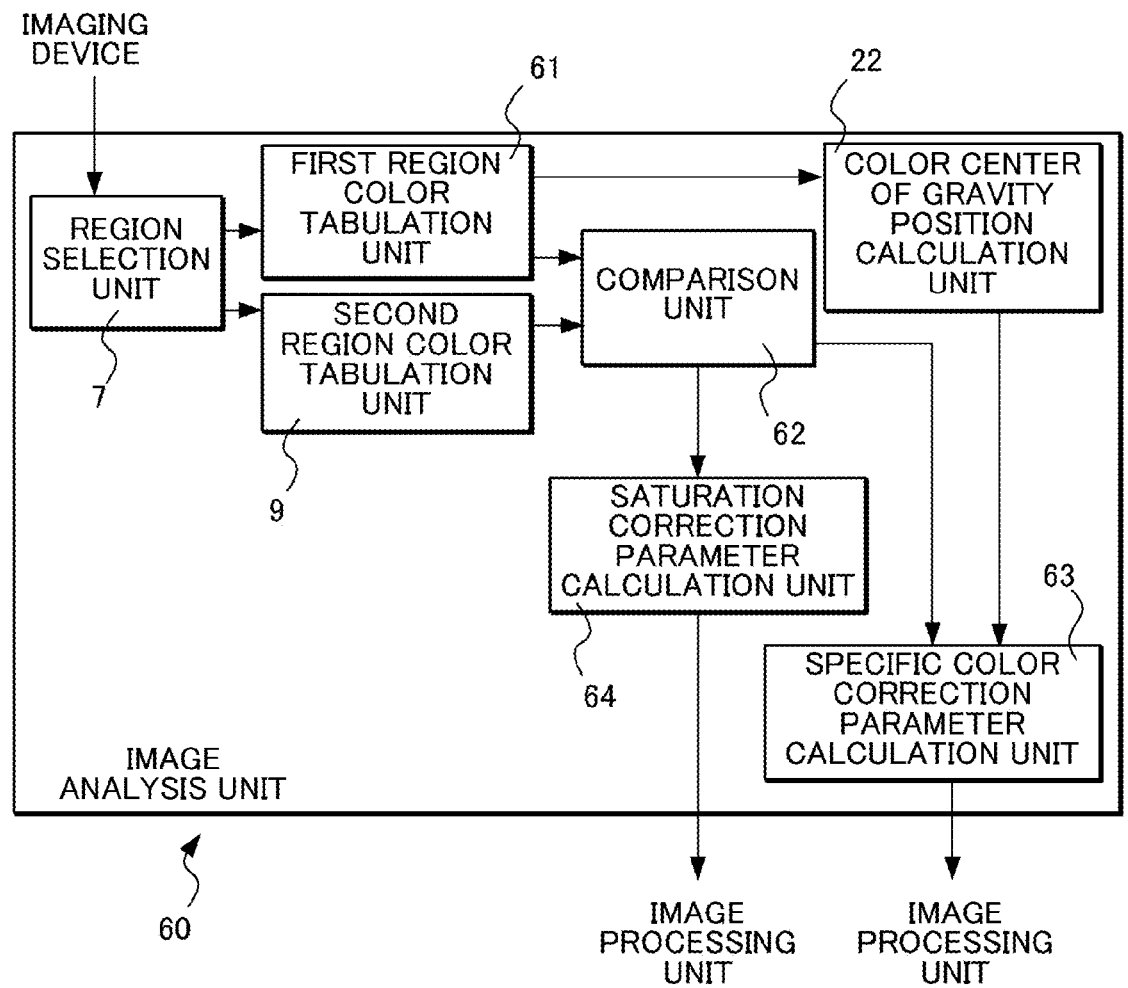
FIG. 24 is a schematic block diagram showing an image analysis unit according to a fifth embodiment.

The image analysis unit 60 will be described using FIG. 24. FIG. 24 is a schematic block diagram showing the image analysis unit 60.

The image analysis unit 60 comprises the region selection unit 7, a first region color tabulation unit 61, the second region color tabulation unit 9, the color center of gravity position calculation unit 22, a comparison unit 62, a specific color correction parameter calculation unit (color correction region setting unit) 63, and a saturation correction parameter calculation unit 64.

The first region color tabulation unit 61 calculates, in addition to the image characteristic amount of the subject region, position information relating to each pixel. The position information is information relating to the positions of pixels having identical image characteristics (a predetermined image characteristic amount), such as the center of gravity, a dispersion, and a standard deviation of pixels having the same image characteristics. In this embodiment, the center of gravity and the dispersion are used as the position information.

The first region color tabulation unit 61 sorts the pixels in the subject region into saturations and hues, stores the positions of the pixels, and calculates the center of gravity and dispersion of each saturation and hue. The center of gravity and dispersion are also calculated in relation to skin color and sky color.

Figure 25:
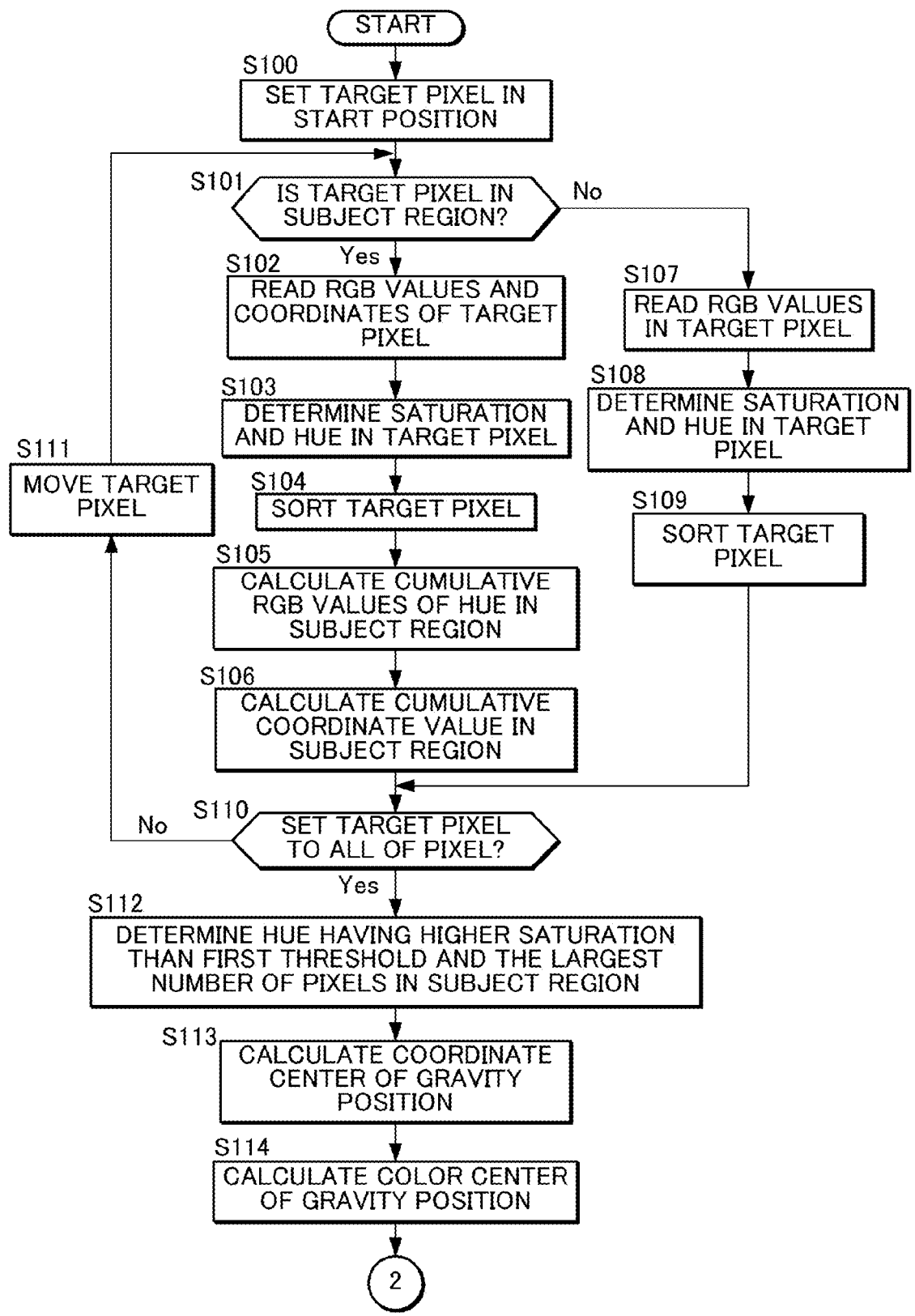
FIG. 25 is a flowchart used to calculate a dispersion.
Figure 26:
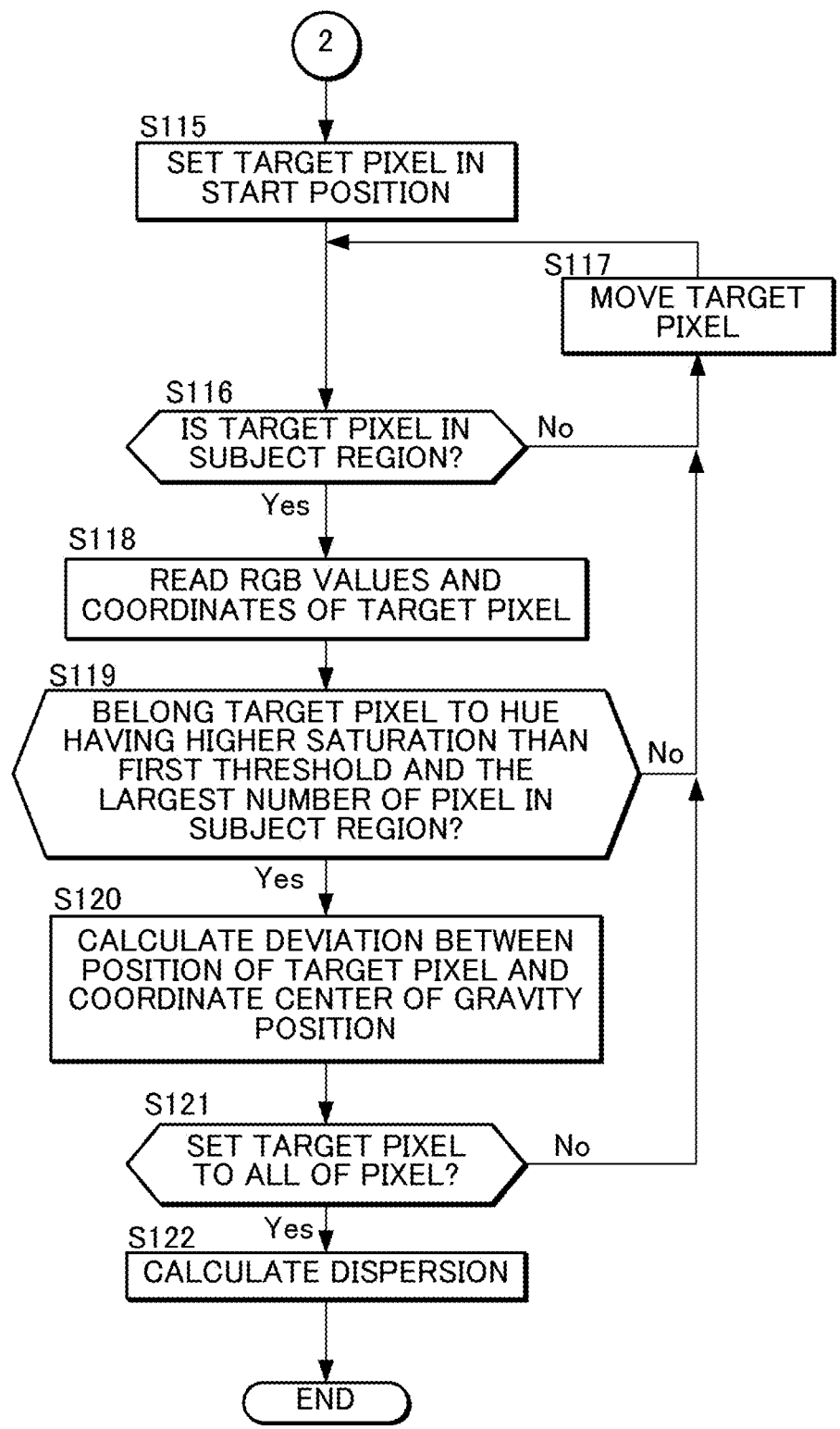
FIG. 26 is a flowchart used to calculate the dispersion.

A method of calculating the dispersion according to this embodiment will now be described using flowcharts shown in FIGS. 25 and 26.

In a step S100, the region selection unit 7 sets a pixel (to be referred to as a target pixel hereafter) for which the hue, saturation and position information are to be read in a start position. The start position is set arbitrarily, and when an upper left point of the imaging device is set as an origin, for example, the start position is set at the origin.

In a step S101, the region selection unit 7 determines whether or not the target pixel is a pixel of the subject region. When the target pixel is a pixel of the subject region, the routine advances to a step S102, and when the target pixel is a pixel of the non-subject region, the routine advances to a step S107.

In the step S102, the first region color tabulation unit 61 reads RGB values and coordinates of the target pixel. The coordinates are read by setting the upper left of the pixel as an origin and using a horizontal direction as an x axis and a vertical direction as a y axis, for example, when the image pickup device is in a normal position.

In a step S103, the first region color tabulation unit 61 determines the saturation and hue to which the target pixel belongs from the read RGB values.

In a step S104, the first region color tabulation unit 61 sorts the target pixel. Here, 1 is added to the image characteristic amount of the saturation and hue into which the target pixel is sorted.

In a step S105, the first region color tabulation unit 61 adds the RGB values of the target pixel respectively to the RGB values of the hue into which the target pixel is sorted, thereby calculating cumulative RGB values of the hue in the subject region.

In a step S106, the first region color tabulation unit 61 accumulates the pixel position of the hue into which the target pixel is sorted, thereby calculating a cumulative coordinate value. The cumulative coordinate value is calculated for both the x coordinate and the y coordinate.

When the target pixel is determined to belong to the non-subject region in the step S101, the second region color tabulation unit 9 reads the RGB values of the target pixel in the step S107.

In a step S108, the second region color tabulation unit 9 determines the saturation and hue to which the target pixel belongs from the read RGB values.

In a step S109, the second region color tabulation unit 9 sorts the target pixel. Here, 1 is added to the image characteristic amount of the saturation and hue into which the target pixel is sorted.

In a step S110, the region selection unit 7 determines whether or not all of the pixels in the imaging device have been set as the target pixel. In other words, a determination is made as to whether or not all of the pixels have been read. When all of the pixels have been set as the target pixel, the routine advances to a step S112, and when a pixel that has not been set as the target pixel exists, the routine advances to a step S111.

In the step S111, the region selection unit 7 moves the position of the target pixel by one pixel. For example, first, the region selection unit 7 sets the target pixel by fixing the y coordinate and shifting the x coordinate by a single pixel, and after the final pixel of the x coordinate has been set as the target pixel, the region selection unit 7 sets the target pixel by shifting the y coordinate by a single pixel. The region selection unit 7 then sets the target pixel by fixing the y coordinate and shifting the x coordinate by a single pixel. By repeating this operation, the region selection unit 7 moves the position of the target pixel.

In the step S112, the first region color tabulation unit 61 determines the hue having a higher saturation than the first threshold and the largest number of pixels in the subject region.

In a step S113, the first region color tabulation unit 61 calculates a coordinate center of gravity position of the hue having a higher saturation than the first threshold and the largest number of pixels in the subject region. The coordinate center of gravity position is calculated by dividing the cumulative coordinate value by the pixel count of the hue.

In a step S114, the color center of gravity position calculation unit 22 calculates the color center of gravity position of the hue having the largest image characteristic amount.

In a step S115, the region selection unit 7 sets the pixel in the start position as the target pixel again.

In a step S116, the region selection unit 7 determines whether or not the target pixel is a pixel of the subject region. When the target pixel is a pixel of the subject region, the routine advances to a step S118, and when the target pixel is a pixel of the non-subject region, the routine advances to a step S117.

In the step S117, the region selection unit 7 moves the position of the target pixel by one pixel. An identical method to that of the step S111, for example, is employed to move the pixel.

In the step S118, the first region color tabulation unit 61 reads the RGB values and coordinates of the target pixel.

In a step S119, the first region color tabulation unit 61 determines whether or not the target pixel belongs to the hue having a higher saturation than the first threshold and the largest number of pixels in the subject region. When the target pixel belongs to the hue having a higher saturation than the first threshold and the largest number of pixels in the subject region, the routine advances to a step S120, and when the target pixel does not belong to the hue having a higher saturation than the first threshold and the largest number of pixels in the subject region, the routine advances to the step S117.

In the step S120, the first region color tabulation unit 61 calculates a deviation between the position of the target pixel and the coordinate center of gravity position. The deviation is calculated in relation to both the x coordinate and the y coordinate.

In a step S121, the region selection unit 7 determines whether or not all of the pixels have been set as the target pixel. When all of the pixels have been set as the target pixel, the routine advances to a step S122, and when a pixel that has not been set as the target pixel exists, the routine advances to the step S117.

In the step S122, the first region color tabulation unit 61 calculates the dispersion of the hue having a higher saturation than the first threshold and the largest number of pixels in the subject region on the basis of the deviation calculated in the step S120. The dispersion is calculated in relation to both the x coordinate and the y coordinate.

It should be noted that from the step S115 onward, the target pixel is set only in the subject region.

Using the method described above, the hue having a higher saturation than the first threshold and the largest number of pixels in the subject region, and the dispersion and color center of gravity position of this hue, are calculated.

When tabulation results obtained by the first region color tabulation unit 61 and second region color tabulation unit 9 are represented by tables, tables such as those shown in FIGS. 27A and 27B, for example, are obtained. FIG. 27A shows the tabulation results obtained by the first region color tabulation unit 61, and FIG. 27B shows the tabulation results obtained by the second region color tabulation unit 9. Here, the center of gravity and dispersion of each hue are shown for descriptive purposes. In FIGS. 27A and 27B, the center of gravity when the saturation is higher than the first threshold is set as "(xKi, yKi)", and the center of gravity when the saturation is lower than the first threshold is set as "(xLi, yLi)". Further, the dispersion when the saturation is higher than the first threshold is set as "(x'Ki, y'Ki)", and the dispersion when the saturation is lower than the first threshold is set as "(x'Li, y'Li)". The center of gravity and the dispersion of skin color in the subject region are set as "(xS1, yS1)" and "(x'S1, y'S1)", respectively. Further, the center of gravity and the dispersion of sky color in the subject region are set as "(xS2, yS2)" and "(x'S2, y'S2)", respectively. Here, "i" corresponds to the hue, similarly to the first embodiment.

Returning to FIG. 24, the comparison unit 62 calculates the first pixel count ratio Pr1, the second pixel count ratio Pr2, and the third pixel count ratio Pr3. Further, the comparison unit 62 compares an x coordinate value and a y coordinate value of the hue having a higher saturation than the first threshold and the largest number of pixels in the subject region. Here, x'Ki and y'Ki of the dispersion are compared and the larger value thereof is set as a representative dispersion VKi. When the representative dispersion VKi is small, the pixels of the hue having a higher saturation than the first threshold and the largest number of pixels in the subject region are concentrated locally. When the representative dispersion VKi is large, the pixels of this hue in the subject region are scattered.

The comparison unit 62 compares the second pixel count ratio Pr2 to the fifth threshold and compares the third pixel count ratio Pr3 to the sixth threshold. Further, the comparison unit 62 compares the representative dispersion VKi to an eighth threshold. The comparison results are output to the specific color correction parameter calculation unit 63 and the saturation correction parameter calculation unit 64. The eighth threshold takes a preset value. The eighth threshold is a value for determining whether the pixels of the hue having a higher saturation than the first threshold and the largest number of pixels in the subject region are concentrated or scattered.

The specific color correction parameter calculation unit 63 calculates the specific color saturation emphasis coefficient on the basis of the comparison results from the comparison unit 62. The specific color saturation emphasis coefficient is calculated on the basis of FIG. 28. For example, when the first pixel count ratio Pr1 is equal to or larger than the second threshold, the second pixel count ratio Pr2 is equal to or larger than the fifth threshold, and the representative dispersion VKi is smaller than the eighth threshold, the specific color saturation emphasis coefficient is 1.5. Further, when the first pixel count ratio Pr1 is equal to or larger than the second threshold, the second pixel count ratio Pr2 is equal to or larger than the fifth threshold, and the representative dispersion VKi is equal to or larger than the eighth threshold, the specific color saturation emphasis coefficient is 1.1. In other words, when the representative dispersion VKi is small such that the pixels of the hue having a higher saturation than the first threshold and the largest number of pixels in the subject region are concentrated, the specific color saturation emphasis coefficient is increased in order to emphasize this hue.

The saturation correction parameter calculation unit 64 calculates the saturation emphasis coefficient on the basis of the comparison results obtained by the comparison unit 62. The saturation emphasis coefficient is calculated on the basis of FIG. 28. For example, when the first pixel count ratio Pr1 is equal to or larger than the second threshold, the second pixel count ratio Pr2 is equal to or larger than the fifth threshold, and the representative dispersion VKi is smaller than the eighth threshold, the saturation emphasis coefficient is 1.0.

It should be noted that in this embodiment, the dispersion is used as the position information, but a standard deviation, information indicating a distance from the center of gravity, and so on may be used instead. Alternatively, a method of creating an image having a reduced resolution from the image obtained by the imaging device and determining variation by comparing the image characteristic amount of the created images, or a method of binarizing an image by the hue and saturation of a specific color and determining variation from an area of respective blocks in parts having identical values, information relating to a distance between the blocks, a borderline length of the block, and so on, may be used.

Effects of the fifth embodiment of this invention will now be described.

Figure 29A:
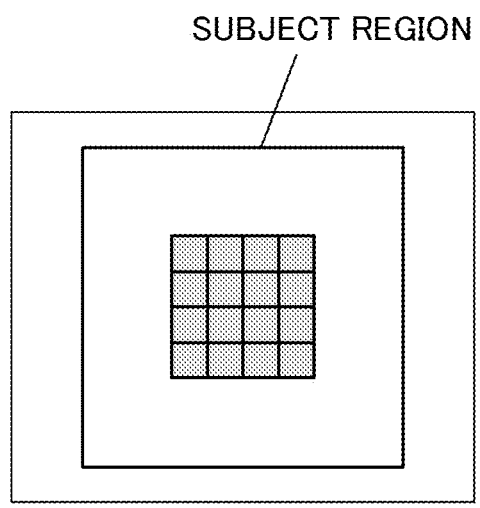
FIG. 29A is a view showing a state of pixels in the subject region.
Figure 29B:
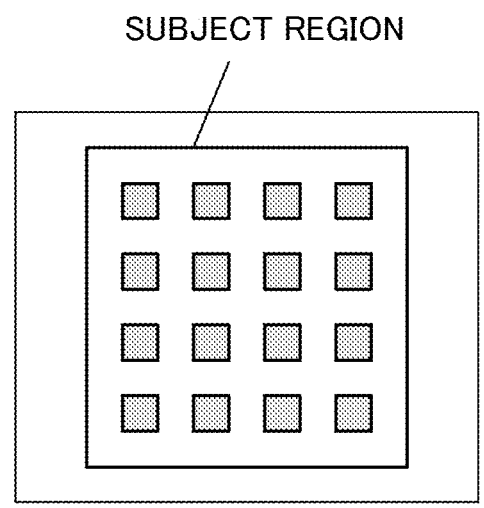
FIG. 29B is a view showing a state of the pixels in the subject region.

Even when the image characteristic amount of the subject region is constant, the state of the subject region varies according to the state of the pixels (the state of blocks of pixels of the specific color and so on), as shown in FIGS. 29A and 29B, for example. FIG. 29A shows a state in which the pixels of the specific color are concentrated near the center of the subject region, and FIG. 29B shows a state in which the pixels of the specific color are dispersed. In FIG. 29A, the main object is concentrated, and therefore the main object can be emphasized by increasing specific color emphasis. In FIG. 29B, however, either a plurality of objects are dispersed or the colors of the main object are dappled, and therefore, when only the specific color is greatly emphasized, similarly to the case shown in FIG. 29A, only that color is made distinctive, and as a result, the main object conversely becomes less distinctive. Hence, in the case shown in FIG. 29B, specific color correction emphasis must be reduced in comparison with FIG. 29A in order to increase the overall saturation.

In this embodiment, the dispersion of the hue having a higher saturation than the first threshold and the largest number of pixels in the subject region is calculated, whereupon the specific color saturation emphasis coefficient and the saturation emphasis coefficient are calculated using the dispersion. The image is then corrected using the specific color saturation emphasis coefficient and saturation emphasis coefficient. For example, when the image characteristic amount is biased toward a certain hue in the subject region and the pixels of that hue are concentrated in a fixed part of the subject region, the specific color saturation emphasis coefficient is increased. It is thus possible to emphasize only colors close to the hue, and as a result, the main object can be made distinctive. In another example, when the image characteristic amount is biased toward a certain hue in the subject region and the pixels of that hue are scattered over the subject region, the specific color saturation emphasis coefficient is reduced in comparison with a case in which the pixels of the hue are concentrated. As a result, flickering or the like caused by a color spreading illusion or the like that may occur when only colors close to the hue are greatly emphasized can be suppressed, and as a result, the main object can be made suitably distinctive.

A sixth embodiment of this invention will now be described.

In the image pickup device according to this embodiment, an image analysis unit 70 and an image processing unit 80 differ from their counterparts in the third embodiment. Here, the image analysis unit 70 and the image processing unit 80 will be described. Constitutions of the image analysis unit 70 which are identical to those of the third embodiment have been allocated identical reference numerals to the third embodiment and description thereof has been omitted.

Figure 30:
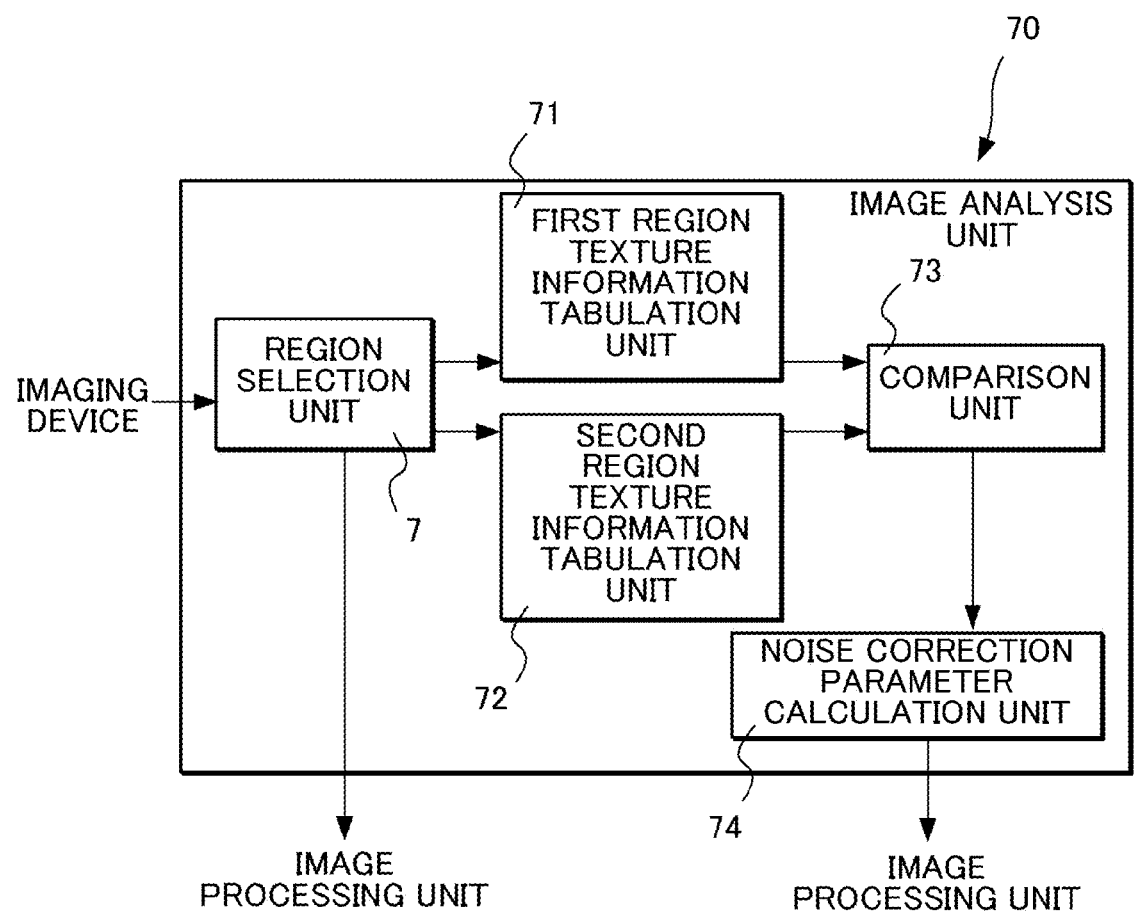
FIG. 30 is a schematic block diagram showing an image analysis unit according to a sixth embodiment.

The image analysis unit 70 will be described using FIG. 30. FIG. 30 is a schematic block diagram showing the image analysis unit 70.

The image analysis unit 70 comprises the region selection unit 7, a first region texture information tabulation unit 71, a second region texture information tabulation unit 72, a comparison unit 73, and a noise correction parameter calculation unit 74.

Figure 31:
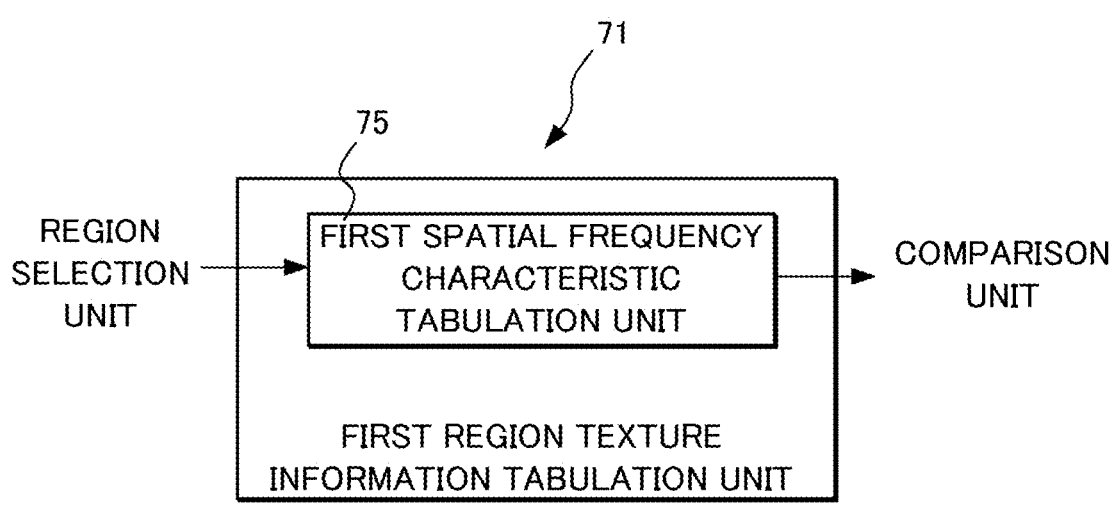
FIG. 31 is a schematic block diagram showing a first region texture information tabulation unit according to the sixth embodiment.

As shown in FIG. 31, the first region texture information tabulation unit 71 is constituted by a first spatial frequency characteristic tabulation unit 75. In this embodiment, a texture is determined from a frequency distribution. The first region texture information tabulation unit 71 determines the texture of the subject region by tabulating the spatial frequency distribution of the subject region. It should be noted that the texture may be determined on the basis of information relating to a granularity of the image, edge information, an edge intensity histogram, and so on.

The first region texture information tabulation unit 71 calculates the first integrated value Eh, which is an integrated value of the quantities of high frequencies equal to or higher than the predetermined frequency in the subject region, and the second integrated value El, which is an integrated value of the quantities of low frequencies smaller than the predetermined frequency in the subject region, from the relationship between the frequencies of the subject region and the quantities of the frequencies, shown in FIG. 15.

The second region texture information tabulation unit 72, similarly to the first region texture information tabulation unit 71, is constituted by a second spatial frequency characteristic tabulation unit (not shown). The second region texture information tabulation unit 72 calculates the third integrated value Fh, which is an integrated value of the quantities of high frequencies equal to or higher than the predetermined frequency in the non-subject region, and the fourth integrated value Fl, which is an integrated value of the quantities of low frequencies smaller than the predetermined frequency in the non-subject region, from the relationship between the frequencies of the non-subject region and the quantities of the frequencies, shown in FIG. 16.

The comparison unit 73 calculates the integrated value ratio (I) (=Eh/Fh), which is a ratio between the first integrated value Eh and the third integrated value Fh, and compares the integrated value ratio (I) with a ninth threshold. The ninth threshold takes a preset value, and when the integrated value ratio (I) is equal to or larger than the ninth threshold, it is determined that the texture of the subject region is more granular and has more irregularities than the texture of the non-subject region, for example. The comparison unit 73 also compares the third integrated value Fh to a tenth threshold. The tenth threshold takes a preset value, and is used to determine the texture of the non-subject region. When the third integrated value Fh is equal to or larger than the tenth threshold, it is determined that the texture of the non-subject region has few irregularities and little granularity (to be referred to hereafter as a featureless texture), for example. The comparison results are output to the noise correction parameter calculation unit 74.

The noise correction parameter calculation unit 74 calculates a noise correction coefficient on the basis of the comparison results from the comparison unit 73. The noise correction coefficient is calculated in relation to both the subject region and the non-subject region. When the noise correction coefficient is larger than 1.0, a random noise addition amount is expressed, and as the numerical value of the noise correction coefficient increases, the noise addition amount also increases. Further, when the noise correction coefficient is smaller than 1.0, a noise reduction intensity is expressed, and as the numerical value of the noise correction coefficient decreases, the noise reduction intensifies.

The noise correction coefficient is calculated on the basis of FIG. 32 in accordance with the integrated value ratio (I) and the third integrated value Fh. For example, when the integrated value ratio (I) is equal to or larger than the ninth threshold and the third integrated value Fh is equal to or larger than the tenth threshold, the noise correction coefficient of the subject region is 1.2 and the noise correction coefficient of the non-subject region is 0.8. In other words, in this case, noise is added in the subject region and reduced in the non-subject region.

When the integrated value ratio (I) is large, the texture of the subject region is more granular than the texture of the non-subject region, for example. Hence, by increasing the noise correction coefficient of the subject region and reducing the noise correction coefficient of the non-subject region when the integrated value ratio (I) is large, the granularity of the subject region is emphasized.

Figure 33:
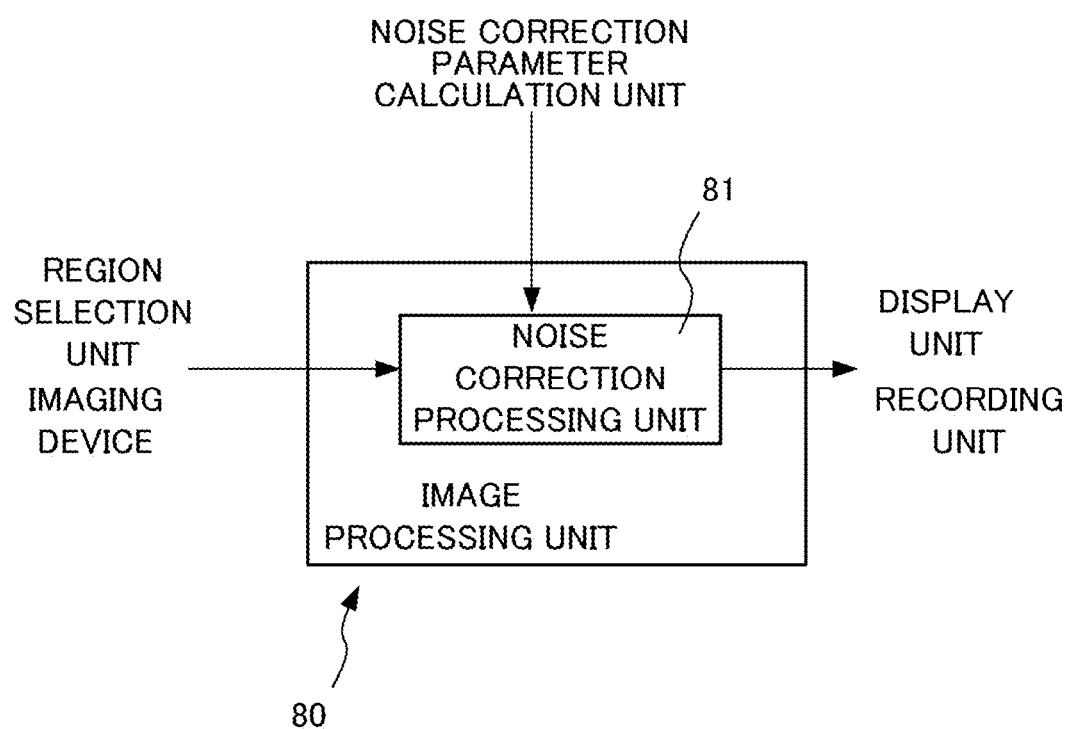
FIG. 33 is a schematic block diagram showing an image processing unit according to the sixth embodiment.

As shown in FIG. 33, the image processing unit 80 includes a noise correction processing unit 81. The noise correction processing unit 81 performs noise processing in the subject region and the non-subject region on the basis of the noise correction coefficient.

Effects of the sixth embodiment of this invention will now be described.

The noise correction coefficient of the subject region and the noise correction coefficient of the non-subject region are calculated on the basis of the texture information relating respectively to the subject region and the non-subject region. By correcting the image on the basis of the respective calculated noise correction coefficients, correction can be performed such that the texture of the subject region is emphasized.

For example, when the texture of the subject region is more granular than the texture of the non-subject region, correction can be performed to emphasize the granularity of the subject region by performing noise addition processing on the subject region. On the other hand, when the texture of the subject region is more featureless than the texture of the non-subject region, for example, granularity in the subject region can be suppressed by performing noise reduction processing on the subject region, and as a result, correction can be performed such that the featurelessness is emphasized.

Furthermore, when the granularity of the non-subject region is small, for example, the noise addition amount of the subject region is increased in comparison with a case where the granularity is large. As a result, correction can be performed such that the granularity of the subject region is emphasized.

Next, a seventh embodiment of this invention will be described.

In the image pickup device according to this embodiment, an image analysis unit 90 and an image processing unit 120 differ from their counterparts in the second embodiment. Here, the image analysis unit 90 and the image processing unit 120 will be described. Constitutions of the image analysis unit 90 and the image processing unit 120 which are identical to those of the second embodiment have been allocated identical reference numerals to the second embodiment and description thereof has been omitted.

Figure 34:
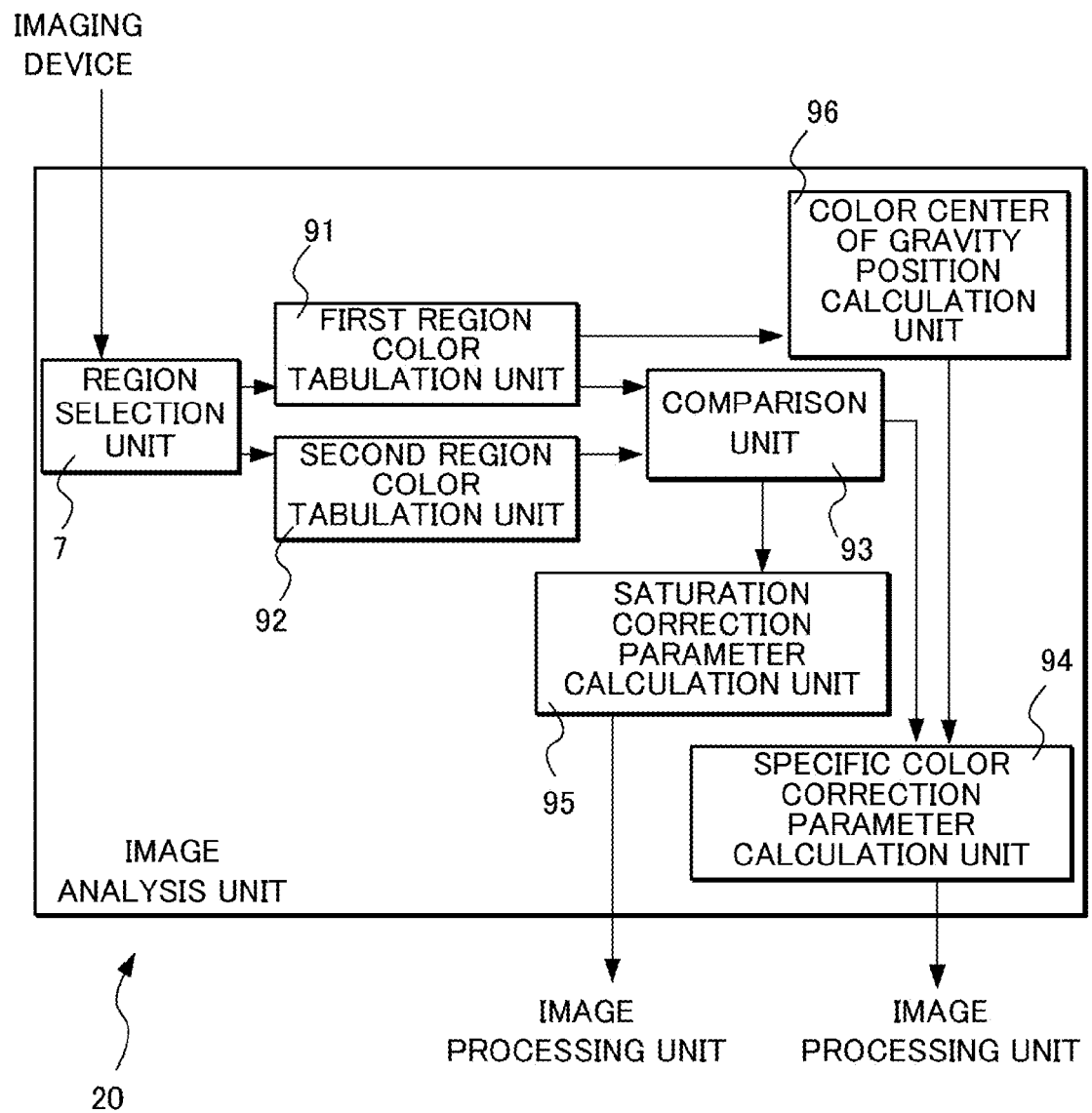
FIG. 34 is a schematic block diagram showing an image analysis unit according to a seventh embodiment.

The image analysis unit 90 will be described using FIG. 34. FIG. 34 is a schematic block diagram showing the image analysis unit 90.

The image analysis unit 90 comprises the region selection unit 7, a first region color tabulation unit 91, a second region color tabulation unit 92, a comparison unit 93, a specific color correction parameter calculation unit 94, a saturation correction parameter calculation unit 95, and a color center of gravity position calculation unit 96.

Figure 35:
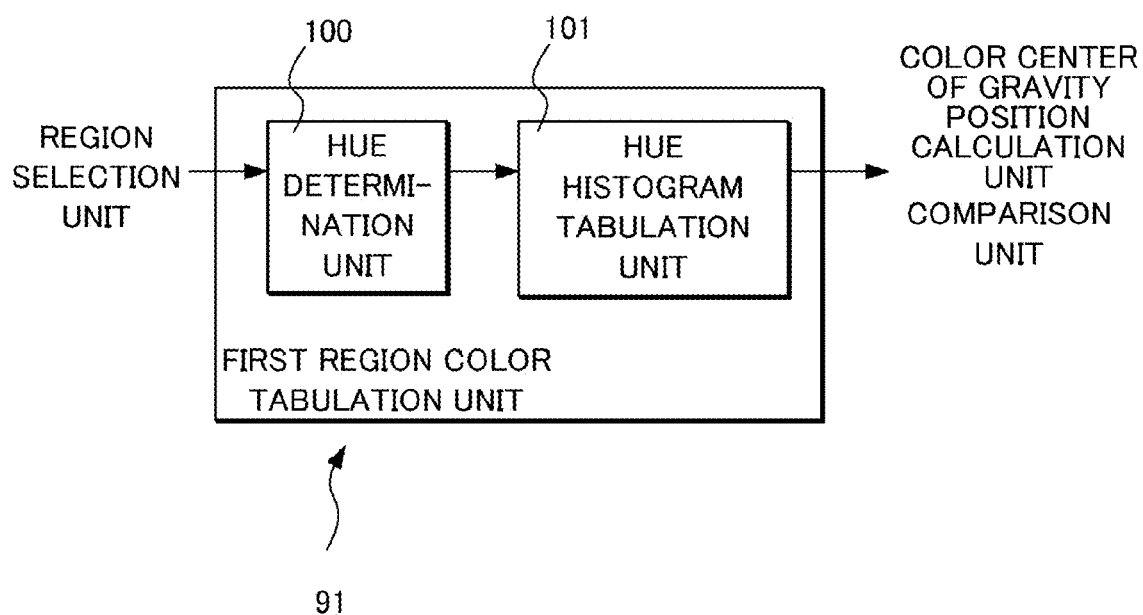
FIG. 35 is a schematic block diagram showing a first region color tabulation unit according to the seventh embodiment.

As shown in FIG. 35, the first region color tabulation unit 91 comprises a hue determination unit 100 and a hue histogram tabulation unit (histogram tabulation unit) 101.

The hue determination unit 100 tabulates the image characteristic amount in the subject region.

The hue histogram tabulation unit 101 creates a saturation histogram of the image characteristic amount. The saturation histogram is created for each hue, regardless of whether or not the saturation is higher than the first threshold. The hue histogram tabulation unit 101 also calculates a mode Hi for each hue. In this embodiment, first, the largest image characteristic amount in the created saturation histograms is set as a temporary mode. When the temporary mode satisfies all of following conditions (1) to (3), the temporary mode is calculated as the mode Hi.

(1) The temporary mode is equal to or higher than a first quartile value (a central value between a minimum value and a median).
(2) The temporary mode is equal to or smaller than a third quartile value (a central value between the median and a maximum value).
(3) An integrated value near the temporary mode is larger than an eleventh threshold.

The integrated value near the temporary mode is an integrated value of image characteristic amount within a predetermined range from the temporary mode. The eleventh threshold takes a preset value. When the temporary mode does not satisfy one of the conditions (1) to (3), the next largest image characteristic amount is set as the temporary mode.

Figure 36:
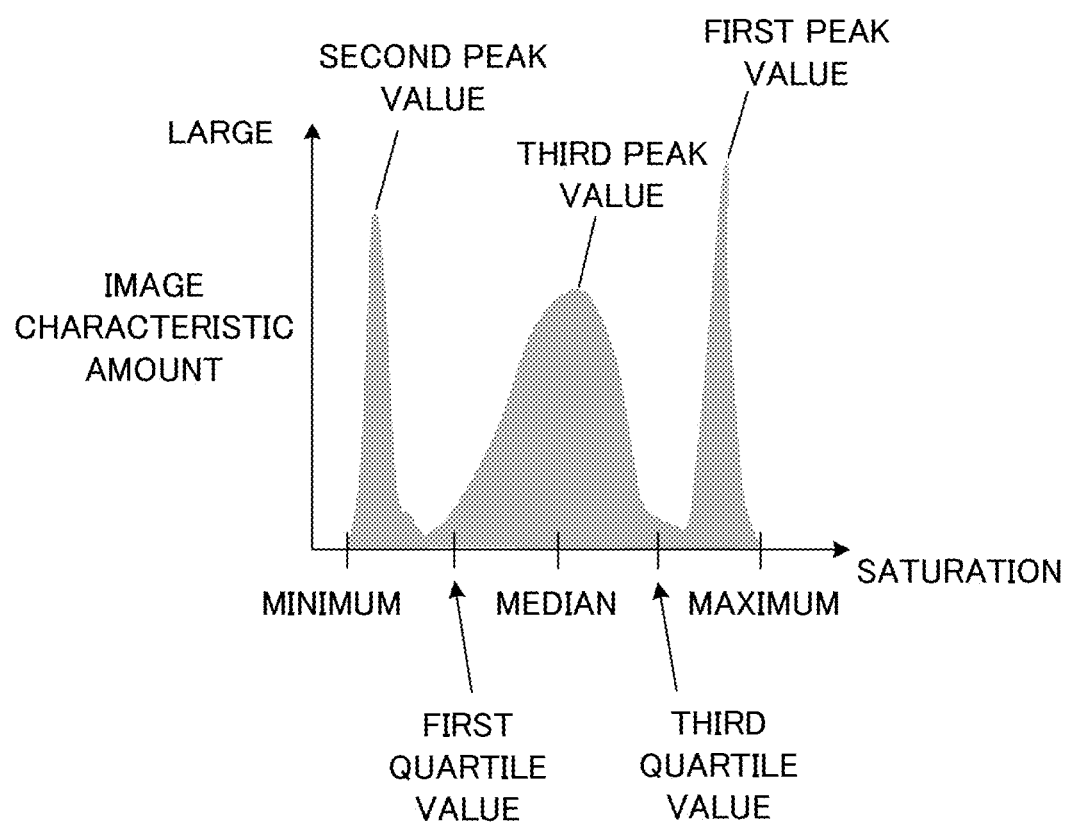
FIG. 36 is a view showing an example of a saturation histogram.

For example, on a saturation histogram shown in FIG. 36, a first peak value of the image characteristic amount between the maximum value and the third quartile value is the largest value, and therefore the first peak value is set initially as the temporary mode. However, this temporary mode is larger than the third quartile value and is not therefore set as the mode Hi. Next, a second peak value of the image characteristic amount between the minimum value and the first quartile value is set as the temporary mode. However, this temporary mode is smaller than the first quartile value and is not therefore set as the mode Hi. Next, a third peak value of the image characteristic amount in the vicinity of the median is set as the temporary mode. This temporary mode is equal to or larger than the first quartile value and equal to or smaller than the third quartile value. Furthermore, the integrated value near the temporary mode is larger than the eleventh threshold. Therefore, this temporary mode is calculated as the mode Hi.

When tabulation results obtained by the first region color tabulation unit 91 are represented by a table, a table such as that shown in FIG. 37, for example, is obtained. FIG. 37 shows the tabulation results obtained by the first region color tabulation unit 91. In FIG. 37, the mode of each hue is set as "Hi". Here, "i" corresponds to the hue, similarly to the first embodiment. The hue histogram tabulation unit 101 calculates a standard deviation $\sigma$ of the hue from the saturation histogram. The standard deviation $\sigma$ is calculated for each hue regardless of the saturation.

The comparison unit 93 calculates the first pixel count ratio Pr1, the second pixel count ratio Pr2, and the third pixel count ratio Pr3. Further, the comparison unit 93 compares the mode Hi of the hue having the largest number of pixels with a twelfth threshold and a thirteenth threshold. Here, the twelfth threshold takes a smaller value than the first threshold and the thirteenth threshold takes a larger value than the first threshold. The twelfth and thirteenth thresholds are set in advance.

The specific color correction parameter calculation unit 94 calculates the specific color saturation emphasis coefficient on the basis of the comparison results from the comparison unit 93. The specific color saturation emphasis coefficient is calculated on the basis of FIG. 38. For example, when the first pixel count ratio Pr1 is equal to or larger than the second threshold, the second pixel count ratio Pr2 is equal to or larger than the fifth threshold, and the mode Hi is larger than the thirteenth threshold, the specific color saturation emphasis coefficient is 1.6. Further, when the first pixel count ratio Pr1 is equal to or larger than the second threshold, the second pixel count ratio Pr2 is equal to or larger than the fifth threshold, and the mode Hi is equal to or larger than the twelfth threshold and equal to or smaller than the thirteenth threshold, the specific color saturation emphasis coefficient is 1.1. As shown by these examples, the value of the specific color saturation emphasis coefficient is modified according to the mode Hi even when other conditions are constant. When the mode Hi is larger than the thirteenth threshold, the saturation of the subject region is larger, and therefore the specific color saturation emphasis coefficient is increased in order to emphasize a specific color. When the mode Hi is equal to or larger than the twelfth threshold and equal to or smaller than the thirteenth threshold, the saturation of the subject region is not so large, and therefore, if a specific color is greatly emphasized, color boundaries may become more evident in comparison with original continuous color variation. Hence, the specific color saturation emphasis coefficient is reduced in comparison with a case where the mode Hi is larger than the thirteenth threshold.

The specific color correction parameter calculation unit 94 calculates a first color correction amount on the basis of the color center of gravity position and the specific color saturation emphasis coefficient. The first color correction amount is calculated using Equation (3).

Further, the specific color correction parameter calculation unit 94 calculates a color correction region on the basis of the color center of gravity position and the standard deviation G.

The color correction region is calculated using Equation (5).

Color correction region=color center of gravity position±σ  Equation (5)

The saturation correction parameter calculation unit 95 calculates the saturation emphasis coefficient on the basis of the comparison results from the comparison unit 93. The saturation emphasis coefficient is calculated on the basis of FIG. 38. For example, when the first pixel count ratio Pr1 is smaller than the second threshold, the second pixel count ratio Pr2 is smaller than the fifth threshold, and the mode Hi is equal to or larger than the twelfth threshold and equal to or smaller than the thirteenth threshold, the saturation emphasis coefficient is 0.7. Further, when the first pixel count ratio Pr1 is smaller than the second threshold, the second pixel count ratio Pr2 is smaller than the fifth threshold, and the mode Hi is larger than the thirteenth threshold, the saturation emphasis coefficient is 1.0.

Figure 39:
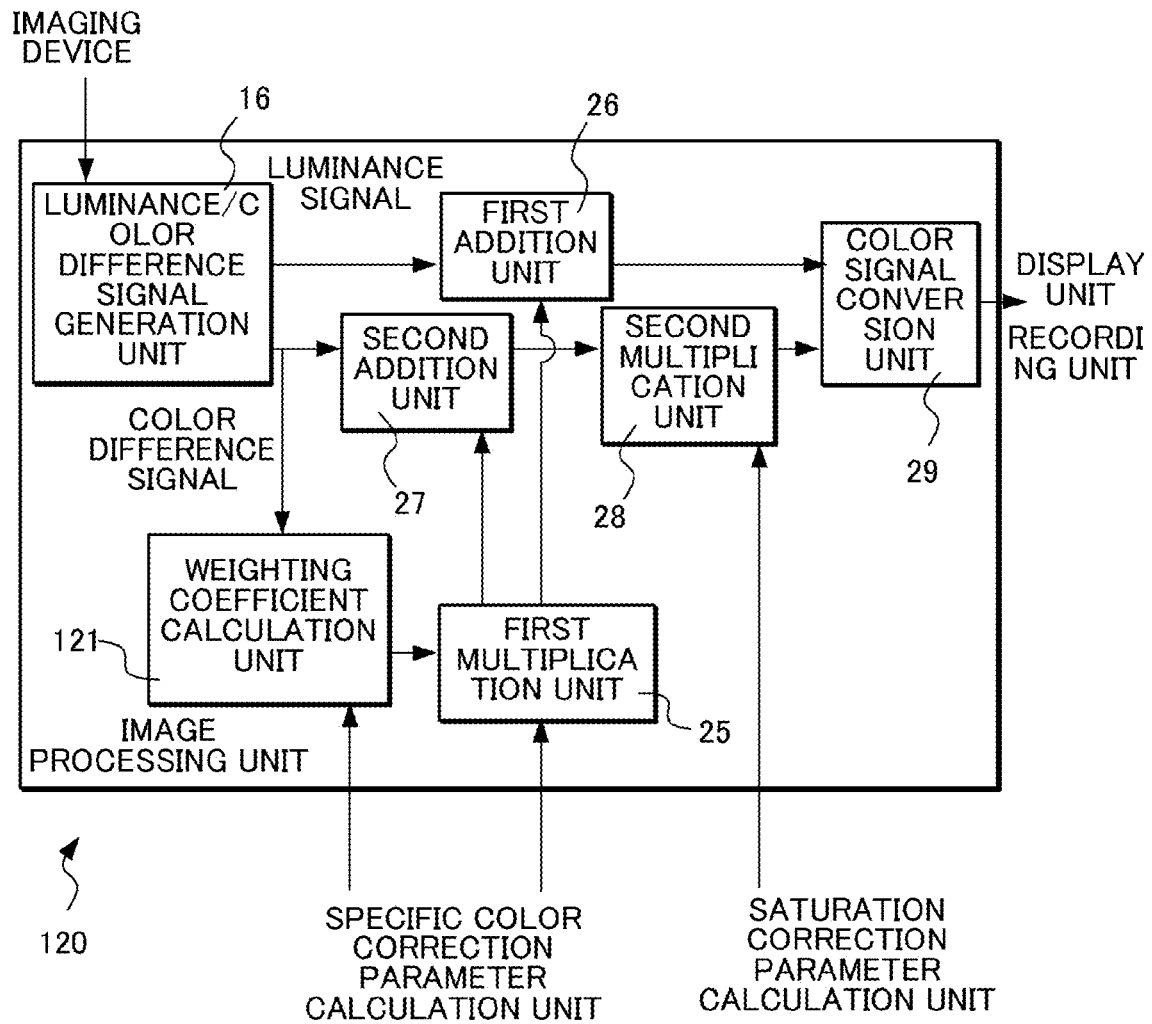
FIG. 39 is a schematic block diagram showing an image processing unit according to the seventh embodiment.

Next, the image processing unit 120 will be described using FIG. 39. FIG. 39 is a schematic block diagram showing the image processing unit 120. The image processing unit 120 comprises the luminance/color difference signal generation unit 16, a weighting coefficient calculation unit 121, the first multiplication unit 25, the first addition unit 26, the second addition unit 27, the second multiplication unit 28, and the color signal conversion unit 29.

The weighting coefficient calculation unit 121 calculates a weighting coefficient on the basis of the color correction region calculated by the specific color correction parameter calculation unit 94. The method of calculating the weighting coefficient is similar to that described in the second embodiment.

In this embodiment, the mode Hi is set using the maximum value, the minimum value, the first quartile value, and the third quartile value, but the largest image characteristic amount in the saturation histogram may be set as the mode Hi without using these values. Further, when setting the mode Hi, the mode Hi may be corrected using an average value. When a deviation between the mode Hi and the average value is large, the mode Hi is corrected taking the average value into account.

Effects of the seventh embodiment of this invention will now be described.

The saturation histogram is created in the subject region, and the saturation emphasis coefficient and specific color saturation emphasis coefficient are calculated on the basis of statistical information from the saturation histogram. By correcting the image using the calculated saturation emphasis coefficient and specific color saturation emphasis coefficient, the main object can be made appropriately distinctive. For example, when the image characteristic amount is biased toward a certain hue in the subject region and the mode Hi of the saturation histogram is larger than the thirteenth threshold, it may be determined that a certain hue in the subject region has a large number of pixels with a large saturation. Therefore, the main object can be made more distinctive by increasing the specific saturation emphasis coefficient such that the colors of the hue are greatly emphasized. When the image characteristic amount is biased toward a certain hue in the subject region but the mode Hi of the saturation histogram is equal to or larger than the twelfth threshold and equal to or smaller than the thirteenth threshold, on the other hand, it may be determined that a certain hue in the subject region has a large number of pixels with a medium saturation. Hence, if the specific saturation emphasis coefficient is increased, the color boundaries in the hue may become more evident, and therefore color adjustment is performed without increasing the specific saturation emphasis coefficient so that the color boundaries do not become more evident.

Further, by calculating the standard deviation σ of the hue and setting the color correction region using the standard deviation σ, smoother color correction can be performed.

It should be noted that the embodiments described above may be combined. Further, the saturation emphasis coefficient shown in FIG. 7 and so on is merely an example and is not limited to these numerical values.

The image pickup device described above may be installed in an electronic apparatus that depends on an electric current or an electromagnetic field in order to work correctly, including a digital camera, a digital video camera, an endoscope, and so on.

Further, in the description of the embodiments, it is assumed that the processing performed by the image pickup device is hardware processing, but this invention is not limited to this constitution, and the processing may be performed using separate software, for example.

In this case, the image pickup device comprises a CPU, a main storage device such as a RAM, and a computer-readable storage medium storing a program for realizing all or a part of the processing described above. Here, this program will be referred to as an image processing program. By having the CPU read the image processing program stored on the storage medium so as to execute information processing/calculation processing, similar processing to that of the image pickup device described above is realized.

Here, the computer-readable storage medium is a magnetic disk, a magneto-optical disk, a CD-ROM, a DVD-ROM, a semiconductor memory, or similar. Alternatively, the image processing program may be distributed to a computer via a communication line such that the computer, having received the distributed program, executes the image processing program.

This invention is not limited to the embodiments described above and includes various modifications and amendments that may be made within the scope of the technical spirit thereof.

This application claims priority based on Japanese Patent Application No 2009-238527, filed with the Japan Patent Office on Oct. 15, 2009, and Japanese Patent Application No 2010-203096, filed with the Japan Patent Office on Sep. 10, 2010, the entire contents of which are incorporated into this specification by reference.

What is claimed is:

1. An image processing device that corrects an obtained image, comprising:
    an image acquisition unit that obtains the image;
    a region setting unit that sets a first region including a main object and a second region not including the main object on the image;
    an image characteristic amount calculation unit that calculates a first image characteristic amount, which is an occurrence state of a predetermined image characteristic amount, respectively in the first region and the second region;
    a comparison unit that compares the first image characteristic amounts of the first region and the second region;
    an image characteristic adjustment unit that adjusts a second image characteristic amount of the obtained image on the basis of a comparison result obtained by the comparison unit;

a color center of gravity position calculation unit that calculates a color center of gravity position with regard to a hue that has a higher saturation than a predetermined threshold and appears most frequently in the first region;

a color correction region setting unit that sets a color correction region, which is a range of a color to be corrected, on the basis of the color center of gravity position; and a specific color correction unit that corrects a color belonging to the color correction region set by the color correction region setting unit.

2. The image processing device as defined in claim 1, further comprising:

a weighting calculation unit that calculates a weighting relative to the color belonging to the color correction region on the basis of the color center of gravity position; and a color correction amount setting unit that sets a color correction amount for the color belonging to the color correction region on the basis of the weighting, wherein the specific color correction unit performs correction on the basis of the color correction amount set by the color correction amount setting unit.

3. The image processing device as defined in claim 1, wherein the image characteristic amount calculation unit calculates position information relating to a pixel having the first image characteristic amount in the first region, and the color correction region setting unit sets the color correction region on the basis of the center of gravity position and the position information.

4. The image processing device as defined in claim 3, wherein the position information includes at least one of a center of gravity, a dispersion, and a standard deviation.

5. The image processing device as defined in claim 3, wherein the image characteristic adjustment unit performs adjustment to emphasize a saturation of the color correction region.

6. The image processing device as defined in claim 5, wherein the position information is a dispersion or a standard deviation, and a saturation emphasis of the color correction region increases as the dispersion or the standard deviation decreases.

7. A non-transitory computer-readable storage medium storing a program for causing a computer to perform processing on an obtained image, wherein the program comprises:

a step of obtaining the image;

a step of setting a first region including a main object and a second region not including the main object on the image;

a step of calculating a first image characteristic amount, which is an occurrence state of a predetermined image characteristic amount, respectively in the first region and the second region;

a step of comparing including:

a first sub-step of comparing the first image characteristic amounts of the first region with a first threshold, and of comparing the first image characteristic amounts of the second region with a second threshold;

a second sub-step of calculating a parameter according to a comparison result obtained by the first sub-step, and of comparing the parameter with a third threshold; and a step of adjusting a second image characteristic amount of the obtained image on the basis of the second sub-step;

a step of calculating a color center of gravity position with regard to a hue that has a higher saturation than a predetermined threshold and appears most frequently in the first region;

a step of setting a color correction region, which is a range of a color to be corrected, on the basis of the color center of gravity position; and a step of correcting a color belonging to the color correction region set by the color correction region setting unit.

8. An image processing method for correcting an obtained image, comprising:

a step of obtaining the image;

a step of setting a first region including a main object and a second region not including the main object on the image;

a step of calculating a first image characteristic amount, which is an occurrence state of a predetermined image characteristic amount, respectively in the first region and the second region;

a step of comparing including:

a first sub-step of comparing the first image characteristic amounts of the first region with a first threshold, and of comparing the first image characteristic amounts of the second region with a second threshold;

a second sub-step of calculating a parameter according to a comparison result obtained by the first sub-step, and of comparing the parameter with a third threshold; and a step of adjusting a second image characteristic amount of the obtained image on the basis of the second sub-step;

a step of calculating a color center of gravity position with regard to a hue that has a higher saturation than a predetermined threshold and appears most frequently in the first region;

a step of setting a color correction region, which is a range of a color to be corrected, on the basis of the color center of gravity position; and a step of correcting a color belonging to the color correction region set by the color correction region setting unit.

* * * * *